(12) United States Patent  
Cheich et al.

(10) Patent No.: US 11,059,256 B2  
(45) Date of Patent: Jul. 13, 2021

(54) APPARATUS AND METHOD FOR EXPANDING A SLIT SHEET MATERIAL TO FORM AN EXPANDED PACKAGING PRODUCT

(71) Applicant: Ranpak Corp., Concord Township, OH (US)

(72) Inventors: Robert Cheich, Independence, OH (US); Raimond Demers, Landgraaf (NL); Cals Hubertus, Lagarde Pareol (FR); Peter Urban, Mentor-on-the-Lake, OH (US)

(73) Assignee: Ranpak Corp., Concord Township, OH (US)

( * ) Notice: Subject to any disclaimer, the term of this patent is extended or adjusted under 35 U.S.C. 154(b) by 661 days.

(21) Appl. No.: 15/526,180

(22) PCT Filed: Nov. 13, 2015

(86) PCT No.: PCT/US2015/060638  
§ 371 (c)(1),  
(2) Date: May 11, 2017

(87) PCT Pub. No.: WO2016/077728  
PCT Pub. Date: May 19, 2016

(65) Prior Publication Data  
US 2017/0313017 A1    Nov. 2, 2017

Related U.S. Application Data

(60) Provisional application No. 62/078,972, filed on Nov. 13, 2014, provisional application No. 62/109,887, filed on Jan. 30, 2015.

(51) Int. Cl.  
*B31D 5/00*     (2017.01)  
*B31D 1/00*     (2017.01)

(52) U.S. Cl.  
CPC ......... *B31D 5/0065* (2013.01); *B31D 1/0031* (2013.01); *B31D 5/0069* (2013.01);  
(Continued)

(58) Field of Classification Search  
CPC .. B31D 5/0065; B31D 1/0031; B31D 5/0069; B31D 2205/0017; B31D 2205/0023; B31D 2205/0047; B31D 2205/007  
(Continued)

(56) References Cited

U.S. PATENT DOCUMENTS 1,850,543 A * 3/1932 Gersman ............... B21D 31/046  
                                                   29/6.1  
3,162,642 A * 12/1964 McCafferty .......... C07D 277/66  
                                                   548/180  
(Continued)

FOREIGN PATENT DOCUMENTS

CN        1134687 A       10/1996  
CN        1268473 A       10/2000  
(Continued)

OTHER PUBLICATIONS

Japanese Office Action (Notice of Reason(s) for Rejection) dated Apr. 24, 2018.  
(Continued)

*Primary Examiner* — Sameh Tawfik  
(74) *Attorney, Agent, or Firm* — Renner, Otto, Boisselle & Sklar, LLP

(57) ABSTRACT

An apparatus (10) for converting a slit-sheet stock material (16) into an expanded dunnage product (12) includes a housing (20), a pair of rollers (22, 24) within the housing extending widthwise across a path of the sheet material, and a plurality of guide strips (90) extending from an upstream side of the pair of rollers to a downstream side of the pair of rollers at a plurality of locations spaced across the width of  
(Continued)

the path. The guide strips guide the sheet material between and around the rollers. Exemplary rollers have a plurality of grooves spaced across the width of the path, and the guide strips are received in respective grooves. The guide strips may be connected by a crossbar to form a guide member.

16 Claims, 18 Drawing Sheets

(52) U.S. Cl.
CPC .................. *B31D 2205/007* (2013.01); *B31D 2205/0017* (2013.01); *B31D 2205/0023* (2013.01); *B31D 2205/0047* (2013.01)

(58) Field of Classification Search
USPC ......................................................... 493/463
See application file for complete search history.

(56) References Cited

U.S. PATENT DOCUMENTS

| | | | |
|---|---|---|---|
| 5,538,778 A | 7/1996 | Hurwitz et al. | |
| 5,667,871 A | 9/1997 | Goodrich et al. | |
| 5,688,578 A | 11/1997 | Goodrich | |
| 5,782,735 A | 7/1998 | Goodrich et al. | |
| 5,906,569 A * | 5/1999 | Ratzel | B26D 1/245 493/363 |
| 5,910,079 A * | 6/1999 | Watanabe | B31D 5/006 493/352 |
| 6,419,867 B1 * | 7/2002 | Lang | B31D 5/0065 264/103 |
| 6,565,077 B2 * | 5/2003 | Kawada | B65H 3/06 271/10.03 |
| 6,676,053 B2 * | 1/2004 | Cook | B02C 18/0007 241/223 |
| 7,341,000 B2 * | 3/2008 | Williams | G03G 15/6529 100/172 |
| 7,878,229 B2 * | 2/2011 | Nakajima | B29C 51/24 156/382 |
| 8,424,867 B2 * | 4/2013 | Morisaki | B65H 3/5223 271/117 |
| 9,376,280 B2 | 6/2016 | Page et al. | |
| 9,701,091 B2 | 7/2017 | Page et al. | |
| 2015/0140265 A1 | 5/2015 | Page et al. | |
| 2016/0130104 A1 | 5/2016 | Page et al. | |

FOREIGN PATENT DOCUMENTS

| | | |
|---|---|---|
| DE | 199 11 628 A1 | 9/2000 |
| EP | 0 978 372 A2 | 2/2000 |
| JP | U5072847 U | 10/1993 |
| JP | H09502410 A | 3/1997 |
| JP | 2002037479 A | 2/2002 |
| JP | 3420770 B2 | 6/2003 |
| JP | 3662821 B2 | 6/2005 |
| WO | 1995/007225 A2 | 3/1995 |
| WO | 2015/103251 A1 | 7/2015 |
| WO | 2016/137740 A1 | 9/2016 |
| WO | 2017/039792 A1 | 3/2017 |
| WO | 2017/074535 A1 | 5/2017 |

OTHER PUBLICATIONS

Korean Intellectual Property Office—Korean Notice of Reason for Rejection under Article 63 of the Korean Patent Act.
Second Chinese Office Action dated Apr. 10, 2019.
International Search Report and Written Opinion for Corresponding International Application No. PCT/US2015/06038 dated Feb. 2, 2016.

* cited by examiner

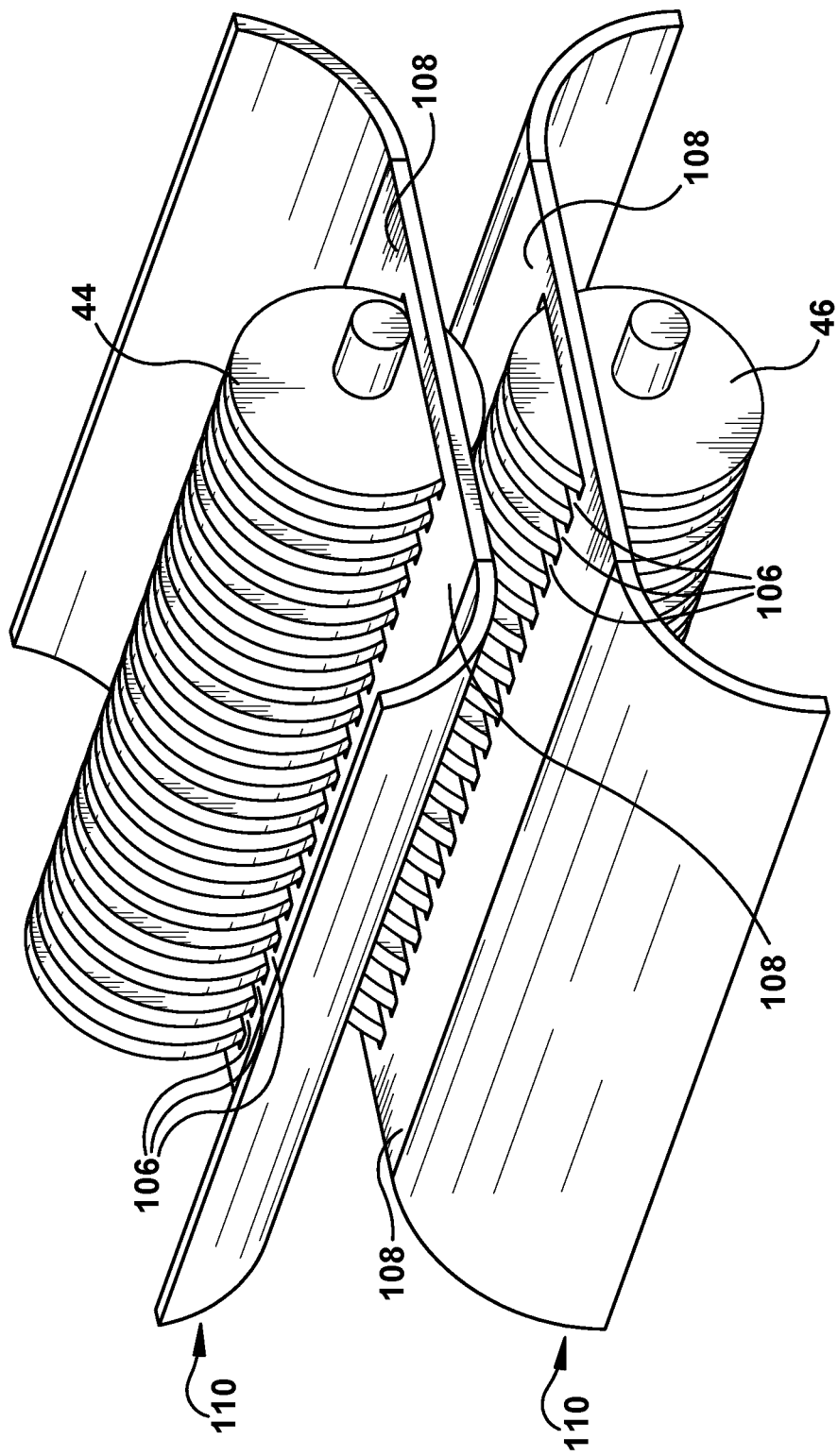

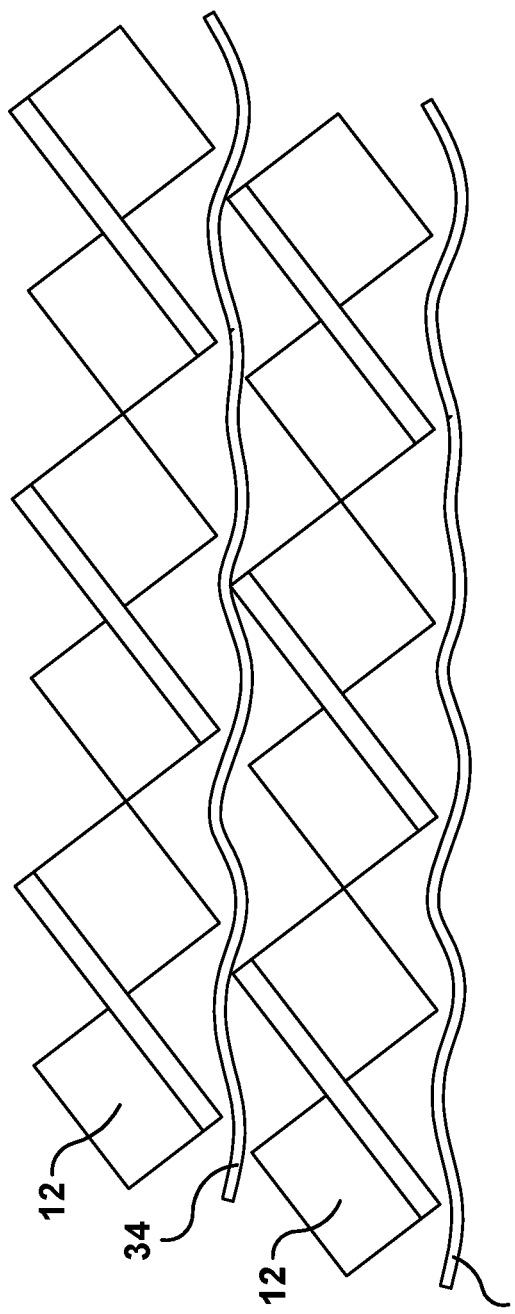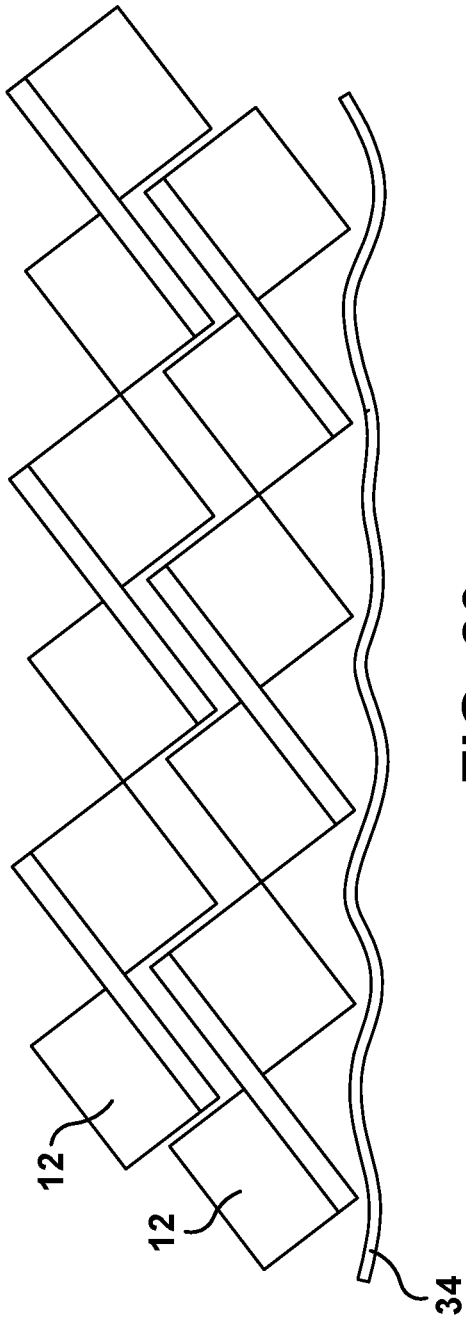
FIG. 19
FIG. 20

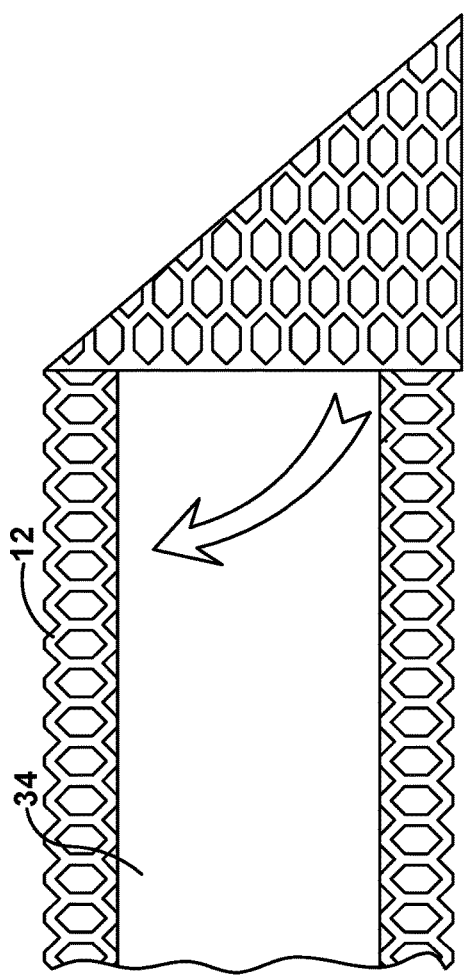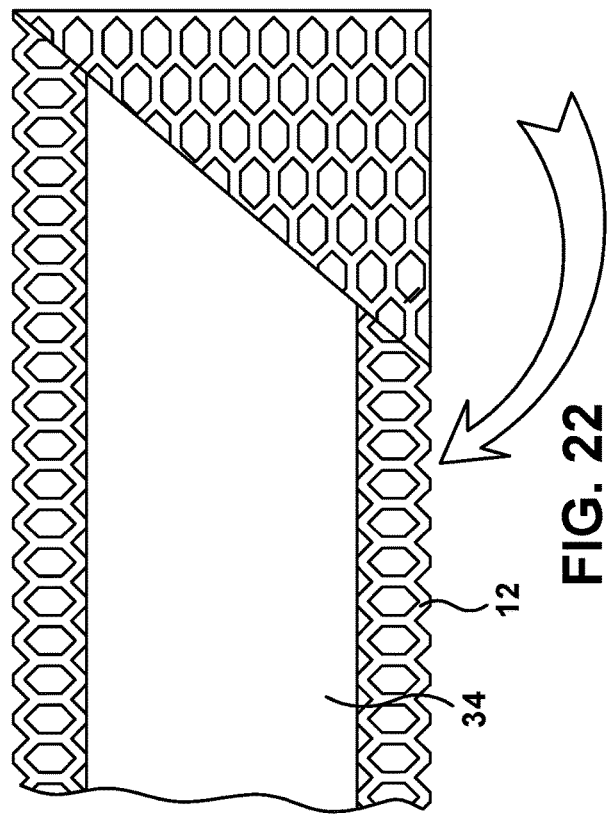

APPARATUS AND METHOD FOR EXPANDING A SLIT SHEET MATERIAL TO FORM AN EXPANDED PACKAGING PRODUCT

This application is a national phase of International Application No. PCT/US2015/060638 filed Nov. 13, 2015 and published in the English language, and which claims priority to U.S. Application No. 62/078,972 filed Nov. 13, 2014 and U.S. Patent Application No. 62/109,887 filed Jan. 30, 2015, which are hereby incorporated herein by reference.

FIELD OF THE INVENTION

The present invention relates in general to a method and apparatus for producing a packaging material by expanding a pre-slit sheet material.

BACKGROUND

When shipping an article from one location to another, the article is typically placed in a container along with protective packaging material to fill the voids about the article and to cushion the article during the shipping process. Expanded slit-sheet paper packing material is an ecologically-friendly packing material that is biodegradable and composed of a renewable resource, and is useful as a cushioning material for wrapping articles and as a void-fill material for packages. The term expanding, as used herein, refers to a three-dimensional expansion, or a volume expansion. The material expands in length and thickness while decreasing in width, to yield about a twenty-fold increase in volume. When the slit-sheet paper is stretched in a direction transverse the direction of the slits, the paper's thickness increases. This stretching and increase in thickness of the slit-sheet paper packing material is referred to as expansion.

Slit-sheet paper packing material typically includes a durable paper with consecutive rows of slits cut into the paper. The thickness of the slit sheet paper packing material can increase by an order of magnitude, or more, relative to its original thickness, when stretched in a direction transverse the direction of the slits. This increased thickness allows the expanded material to serve as a protective cushioning wrap material for articles. Slit sheet paper packing material, and the manufacturing thereof, are described in greater detail in U.S. Pat. Nos. 5,667,871 and 5,688,578, the disclosures of which are incorporated herein by reference in their entireties.

A cushion wrap material formed with expanded slit sheet packing material may include a lightweight tissue paper that acts as a separator sheet between layers of the expanded material. The tissue paper prevents openings in the expanded paper from nesting and becoming undesirably interlocked.

SUMMARY

The present invention provides an improved apparatus for converting and dispensing an expanded slit-sheet packaging material with reduced downtime from jamming and improved loading at start-up.

More specifically, an exemplary apparatus for converting a slit-sheet stock material into an expanded dunnage product includes a housing, a pair of rollers within the housing extending widthwise across a path of the sheet material, and a plurality of guide strips extending from an upstream side of the pair of rollers to a downstream side of the pair of rollers at a plurality of locations laterally spaced across the width of the path.

The guide strips guide the sheet material between and around the rollers, but prevent the sheet material from wrapping around or bypassing the rollers and causing a jam, even if back-pressure is applied to the sheet material downstream of the rollers.

Embodiments of the invention may include one or more of the following additional features. For example, the rollers may have a plurality of grooves laterally spaced across the width of the path, and the guide strips may be received in respective grooves.

The guide strips may be mounted across one or both of the pair of rollers to guide the sheet material between the rollers and prevent the sheet material from bypassing either roller.

Multiple guide strips may be mounted across at least one of the pair of rollers.

The guide strips may have a width dimension that is greater than a thickness dimension, and the width direction may be arranged parallel to the width of the path of the sheet material.

The guide strips may be made of steel.

The rollers may be expansion rollers and the apparatus may further include a pair of drive rollers upstream of the expansion rollers, and a motor coupled to the drive rollers and the expansion rollers such that the peripheral speed of the drive rollers is less than the peripheral speed of the expansion rollers to stretch sheet material passing between the drive rollers and the expansion rollers.

A plurality of guide strips may extend from an upstream side of the pair of drive rollers to a downstream side of the pair of drive rollers at a plurality of locations laterally spaced across the width of the path.

The guide strips of the drive rollers may be configured similar to or the same as the guide strips of the expansion rollers.

The least one of the pair of drive rollers may have a plurality of grooves laterally spaced across the width of the path, and the guide strips for the drive rollers may be received in respective grooves.

The rollers may have regions with a gripping material intermittently spaced with regions free of gripping material along at least one of the respective rollers, and the guide strips may extend across the respective regions free of gripping material.

The guide strips for the drive rollers may extend downstream beyond at least one of the pair of drive rollers by more than twice the maximum outer diameter of the one of the pair of drive rollers.

The housing may further include shroud members that define entrance (or exit) paths for the sheet material to (or from) at least one of the rollers. The guide strips may be attached to the housing or the respective shroud members.

The respective guide strips may be connected at one end by a crossbar configured to extend laterally across the width of the path.

The guide strips and the crossbar may form a unitary guide member.

The crossbar may be located at an upstream side of one or both of the expansion rollers and drive rollers, and the respective guide strips may extend toward a downstream side of the respective expansion rollers or drive rollers.

The crossbar may be mountable to the housing or the respective shroud members.

The respective guide strips may be connected at an opposite end by a second crossbar configured to extend laterally across the width of the path.

The respective guide strips and the respective crossbars may form a unitary guide member. The lateral spacings between the guide strips may define openings in the guide member for receiving respective portions of the expansion rollers or drive rollers.

The guide member may bound at least a portion of the upstream side and the downstream side of one of the pair of rollers, where at least a portion of the upstream side of the guide member extends along a plane transverse to the sheet material, and where at least a portion of the downstream side of the guide member extends along a plane transverse to the sheet material.

The guide member may also define a guide surface that extends from an upstream side of one of the pair of drive rollers to a downstream side of one of the pair of expansion rollers.

The foregoing and other features of the invention are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages and features of the invention will become apparent from the following detailed description of the invention when considered in conjunction with the drawings.

BRIEF DESCRIPTION OF THE DRAWINGS

FIG. 7 is a perspective view of two other exemplary guide members extending across respective upper and lower rollers.

FIG. 19 is a side view of overlapping layers of the expanded sheet-separator sheet combination.

FIG. 20 is a side view of two sheets of expanded paper having reverse inclines in combination with a separator sheet.

FIG. 21 is a front view an expanded sheet-separator combination demonstrating a flag fold used in connection with the dunnage product.

FIG. 22 is another front view of the continued flag fold of FIG. 21.

DETAILED DESCRIPTION

The present invention provides an improved apparatus for producing an expanded slit-sheet packaging material from a roll of unexpanded slit-sheet material with reduced jamming and thus reduced downtime, reduced maintenance, increased efficiency, and improved loading of the apparatus with a supply of slit-sheet packaging material.

Figure 1:
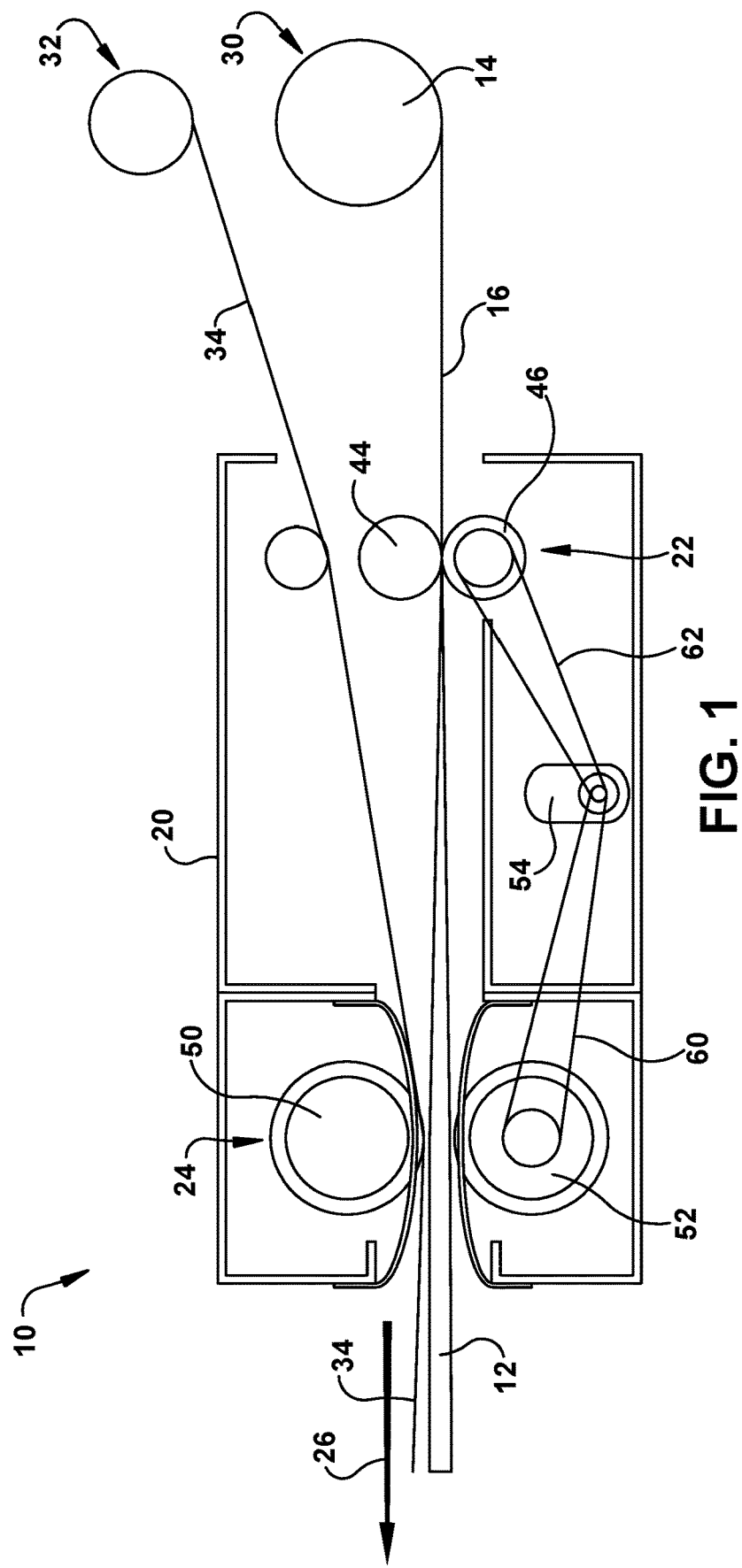
FIG. 1 is a schematic view of an exemplary apparatus for converting a slit-sheet stock material into an expanded dunnage product provided by the invention.
Figure 2:
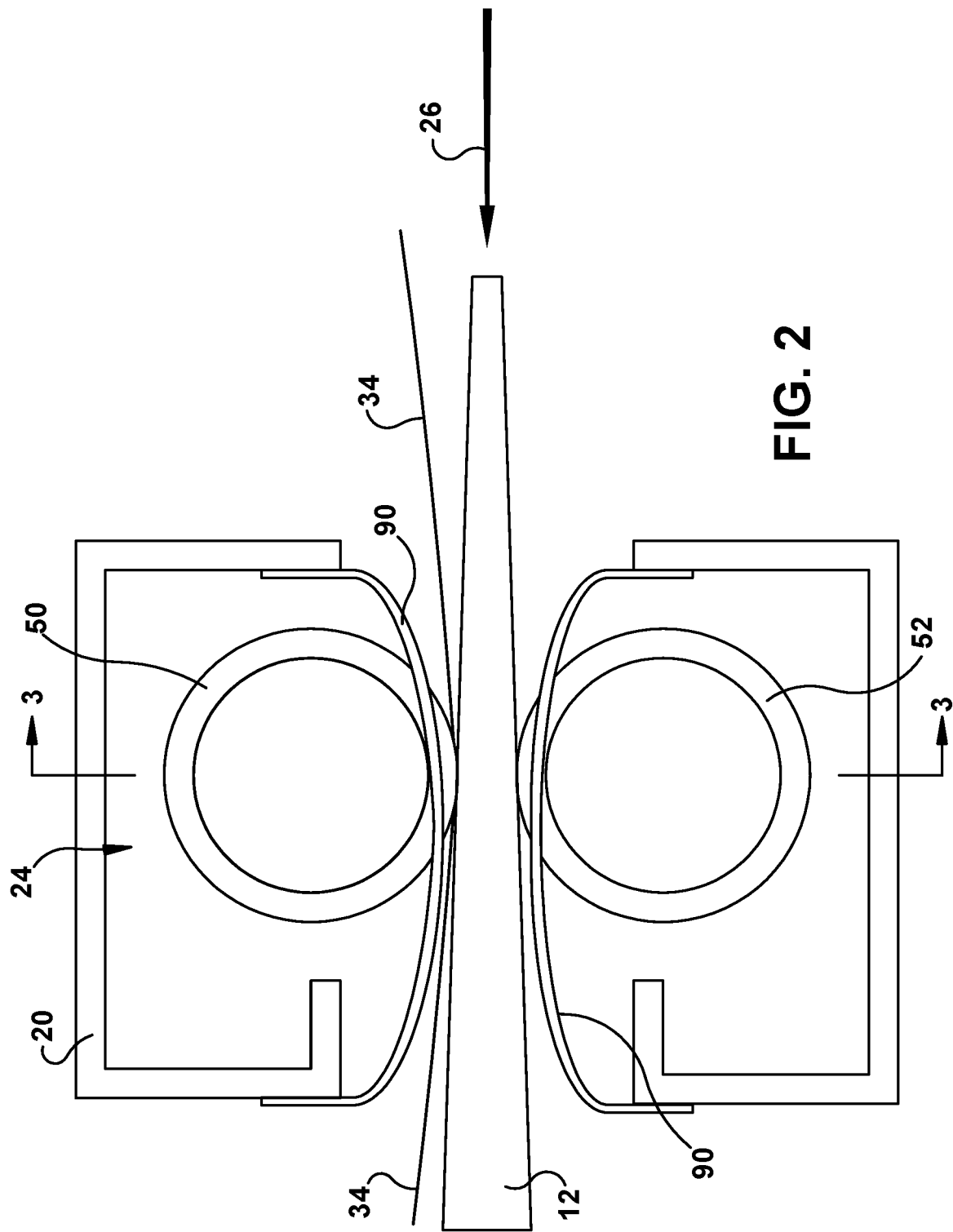
FIG. 2 is an enlarged view of a portion of the apparatus of FIG. 1.
Figure 3:
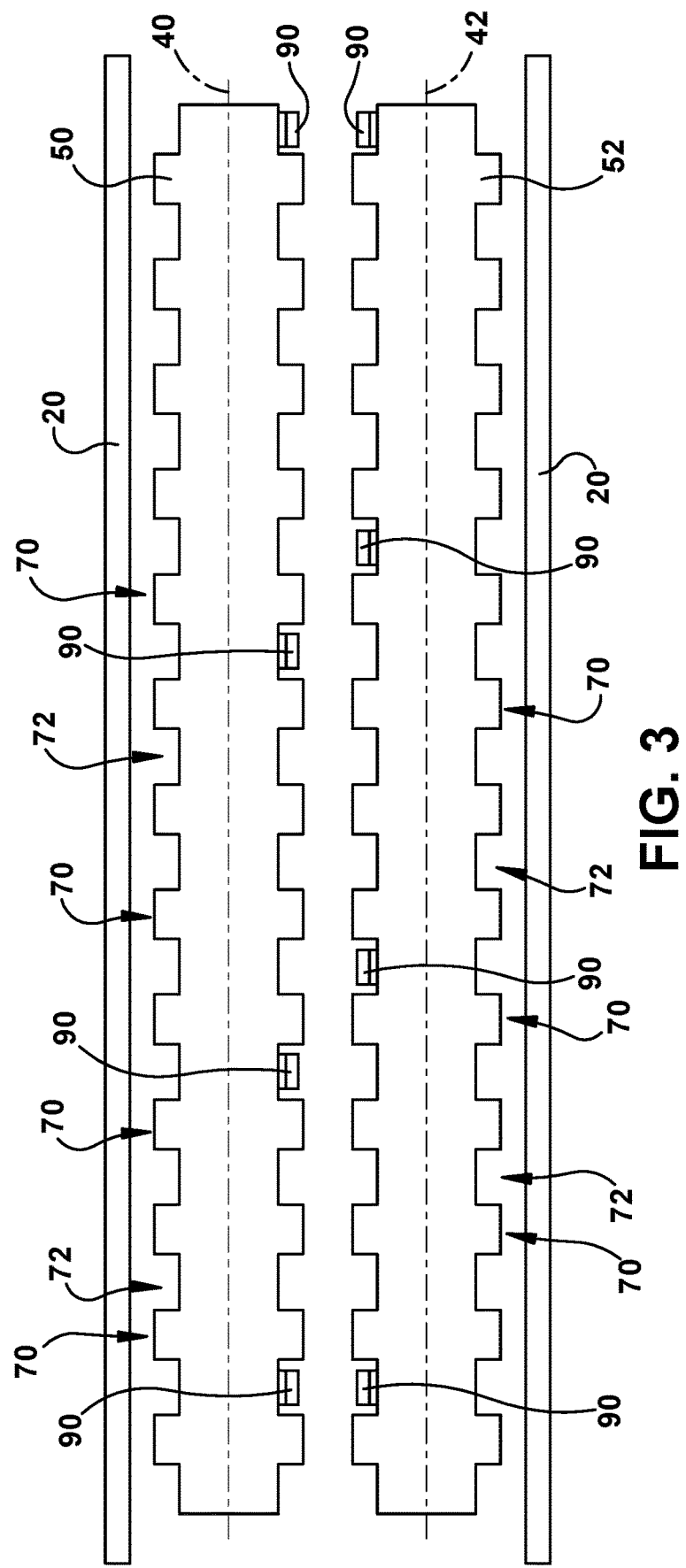
FIG. 3 is a cross-sectional view as seen along lines 3-3 of FIG. 2.

Referring now to the drawings in detail, FIGS. 1 to 3 schematically illustrate an exemplary expanding machine or apparatus 10 for producing an expanded slit-sheet packaging material 12 from a roll 14 of unexpanded slit-sheet material 16, typically paper, such as kraft paper. The apparatus 10 includes a housing 20 containing a pair of drive rollers 22, and a pair of expander (or expansion) rollers 24 spaced downstream of the drive rollers 22. The expandable slit sheet material 16 extends from the expandable material supply 30 and travels in a downstream direction between the drive rollers 22 and the expander rollers 24 to cooperatively cause the expandable material 16 to be stretched to an expanded form 12 with increased length and thickness, and reduced width. The upstream and downstream directions are in reference to a path of the slit-sheet material as it moves through the apparatus 10 in a downstream direction 26 from the drive rollers 22 to the expander rollers 24, the upstream direction being opposite the downstream direction 26.

The apparatus 10 also may include a supply 30 of unexpanded sheet material 16 (such as the illustrated roll 14 of unexpanded sheet material) or a support for such a supply 30 upstream of the drive rollers 22. Additionally, the apparatus 10 may include a supply 32 of a sheet material for use as a separator sheet 34 or a support for such a supply upstream of the expander rollers 24. An exemplary supply 30 or 32 of sheet material includes a sheet material wound into a roll around a hollow core, through which an axle is inserted. The axle can be supported on a separate stand or on a portion of the housing 20 in such a manner as to permit rotation of the roll as the sheet material is drawn off the roll. The housing 20 can be a single, unitary structure, or can be formed of separate components, but it encloses the path of the sheet material between the drive rollers 22 and the expansion rollers 24.

The drive rollers 22 and the expander rollers 24 rotate about respective axes (such as expander roller axes 40 and 42) that extend laterally across and generally parallel to the generally planar path of the slit sheet material 16 as it travels downstream. The drive rollers 22 include an upper drive roller 44 and a lower drive roller 46, closely spaced to engage the relatively thin unexpanded slit sheet material 16. The expander rollers 24 are spaced from the drive rollers 22 and include an upper expander roller 50 and a lower expander roller 52. The expander rollers 50 and 52 generally are spaced further apart from one another than the drive rollers 44 and 46 to engage the relatively thicker expanded slit-sheet material 12 without crushing opened-up cells that form the increased thickness of the expanded sheet material 12.

The spacing of the expansion rollers 24 from the drive rollers 22 produce some binding in the middle of the expandable slit sheet material 16 as it expands, apparently due to the widthwise contraction of the sheet coinciding with the expansion in thickness and length. The distance between the drive rollers 22 and the expansion rollers 24 may vary proportionally with the width of the unexpanded sheet material 16. This is another reason to space the expansion rollers 50 and 52. The relatively wider gap between the expansion rollers 50 and 52 may allow for the widthwise contraction without tearing.

A motor 54 drives the lower drive roller 46 and the lower expander roller 52 through respective drive belts 60 and 62 and pulleys of different sizes to effect the desired speed differential between the drive rollers 22 and the expander rollers 24. The expander rollers 24 have an effective peripheral rotational speed greater than the effective peripheral rotational speed of the drive rollers 22. Therefore rotation of the drive rollers 22 draws the slit sheet material 16 into the housing 20 and the greater rotation of the expansion rollers 24 expands the expandable material in length and thickness.

Thus the expandable slit sheet material 16 is stretched to an expanded form 12 by causing the speed of the downstream expander rollers 24 to be greater than the rotational speed of the upstream drive rollers 22. The tension between the drive rollers 22 and the expansion rollers 24 must be sufficient to open, or expand the slit sheet material 16, but not sufficient to tear the sheet material. The slower rotational speed of the upstream drive rollers 22 relative to the rotational speed at the downstream expander rollers 24 causes the slit sheet material to expand. Accordingly, the expander rollers 24 must be able to engage and advance the expanded slit-sheet material 12 not only without tearing the expanded slit sheet material 12, but also with minimal slippage and minimal compression of the expanded material 12.

At least one of the expander rollers 50 and 52 is formed of or has a gripping material on its surface to engage the expanded slit sheet material 12 with minimal or no crushing. The drive rollers 22 also must grip the unopened slit sheet 16, without ripping the sheet 16, pull the unexpanded slit sheet material 16 from the supply 30 and cooperate with the expander rollers 24 to pull it open through use of the differential speed between the expansion rollers 24 and the drive rollers 22. Exemplary gripping materials may include a rubber or polymer or a plurality of bristles extending from the surface of at least one rollers of the pair. Exemplary bristles are similar to the hooks used in hook-and-loop fasteners. Each bristle has a hook on an outer end, a barb portion of the hook being oriented to engage the slits in the sheet material during the rotation of the expander rollers 24. The expander rollers 50 and 52 may be spaced apart a distance such that the distal ends of the bristles of each roller 50 and 52 extend into openings in the slit material 12 when expanded.

The drive rollers 22 also may be covered with a friction material, such as shrink tubular material made of a heat shrinkable polymer, as for example polyvinyl chloride. Alternatively, a rubber spray or painted coating can be used. Additionally, vinyl tape covered rollers and rubber rollers can be used. There is no theoretical upper limit to the amount of friction caused by the roller fiction covering, except that damage to the paper must be avoided. Abrasive coatings tend to produce some scratching of the paper and formation of dust due to the action of the abrasive material on the paper. So abrasive surfaces generally should be avoided.

The expander rollers 24 must be able to grip and pull the slit sheet material so as to impart a speed of travel that is greater than the speed of the sheet material when it passes through the drive rollers 22. This is in conflict with the need to permit the expanded sheet 12 to pass between the expander rollers 24 without the opened-up cells of the expanded sheet material 12 from being crushed.

One way to address these conflicting goals is to provide expansion rollers 24 that have a gripping material only at spaced locations along the length of the roller 50 or 52 (across the width of the path of the sheet material, generally parallel to the axes 40 and 42 of the respective expander rollers 50 and 52). The gripping material generally is provided at the same locations on the opposing upper and lower expander rollers 50 and 52 to facilitate engaging the expanded sheet material 12 therebetween, but these areas on respective rollers alternatively may be partially offset from one another.

Where the expander rollers are covered with an intermittent pattern of gripping material, as shown in the illustrated embodiment, such that there are regions 70 of gripping material and regions 72 free of gripping material across the expander rollers 50 and 52, crushing of expanded sheet material 12 is reduced or eliminated. The gripping material may be applied to intermittent regions along the length of the roller (parallel to an axis 40 or 42 of the respective expander roller 50 or 52) or the regions 72 free of gripping material may be formed by grooves or recesses formed in the surface of the respective roller 50 or 52. These regions 70 and 72 of the expander rollers 24 can be slightly offset so that only a portion of the gripping material regions 70 of one roller 50 or 52 mates with only a portion of the gripping material regions 70 of the other roller 52 or 50, which serves to maximize the gripping effect of the intermittent configuration, while minimizing the crushing. In essence, the expanded sheet material 12 is gripped at intermittent regions, by the limited mating of the gripping material regions 70.

When back pressure is applied to the expanded sheet material 12, preventing the expanded sheet material from freely exiting the housing without interference, one or both of the expanded sheet material 12 and the separator sheet 34 are pushed or bunch up in an upstream direction against a downstream side of the expander rollers 24, and the sheet material has a tendency to wrap around one or both of the upper and lower expansion rollers 50 and 52, causing a jam condition that requires an operator or other worker's attention to resolve. During this downtime, production is stopped. The jam has to be cleared, and some of the expanded sheet material may have been crushed as it wrapped around the roller and may have to be discarded.

Also, when feeding a new sheet of unexpanded slit sheet material 16 through the drive rollers 22, a leading end of the unexpanded slit sheet material 16 may become bunched up or jammed in the drive rollers 22. Further, the leading end of the unexpanded slit sheet material 16 being fed to the downstream expander rollers 24 may be prevented from passing through the expander rollers 24 by catching on a part of the housing 20 and extend under or over the expander rollers 24, again causing a jam or wasting sheet material before it can be properly expanded. The problem of jamming in either the driver rollers 22 or expander rollers 24 may also occur as the direction of the slit sheet material 16 is reversed, such as when attempting to remove the slit sheet material 16 from the apparatus 10, or when attempting to clear existing jams from the respective rollers 22, 24.

Figure 4:
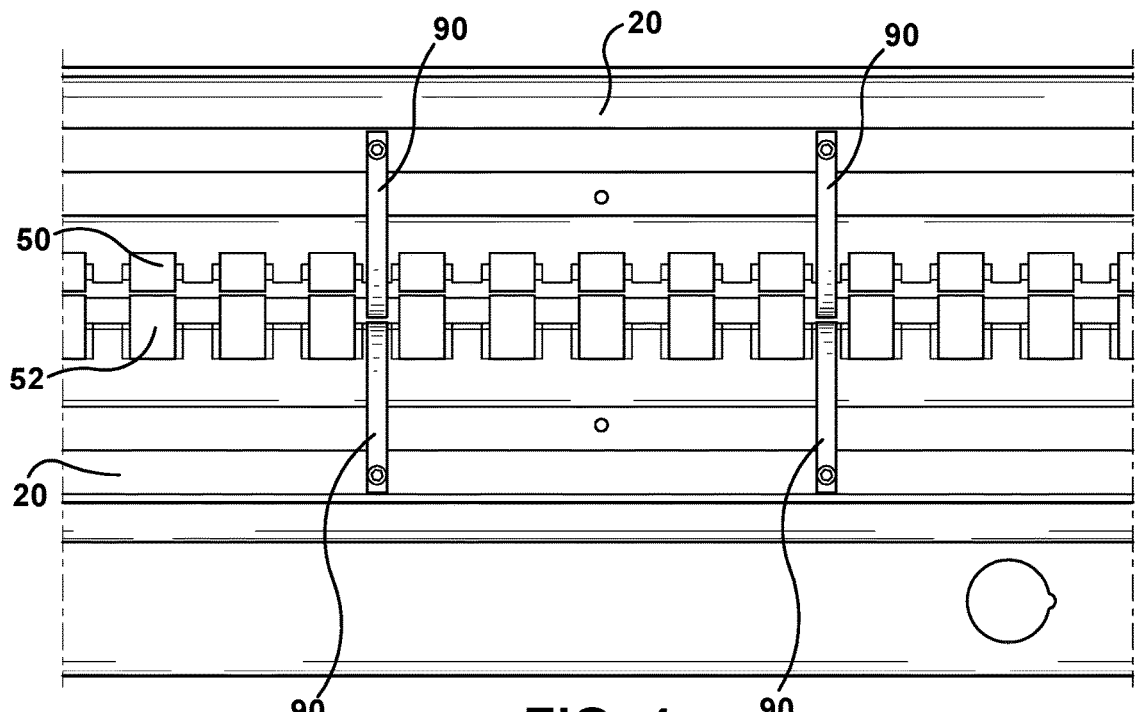
FIG. 4 is an end view of a downstream side of another exemplary apparatus for converting a slit-sheet stock material into an expanded dunnage product provided by the invention.

To address these problems without impairing the ability of the expansion rollers 24 to perform their function, the present invention provides a plurality of continuous guide strips 90 employed at laterally-spaced positions across the width of the path of the sheet material (along the axis 40 or 42 of the respective expansion roller 50 or 52), as shown in FIGS. 2 to 4. For example, these guide strips 90 may extend from an upstream side of the expansion rollers 24 to a downstream side of the expansion rollers 24 within the regions 72 free of gripping material, such as the illustrated recessed or grooved portions, of the expansion rollers 50 and 52 that normally do not significantly contribute to the feeding of the expanded sheet material 12. Consequently, the guide strips 90 do not impair the operation of the expansion rollers 24. Preferably a plurality of guide strips 90 are mounted across each of the upper and lower expansion rollers 50 and 52. The guide strips 90 around the upper expansion roller 50 may be aligned with the guide strips 90 around the lower expansion roller 52 or may be offset.

Figure 5:
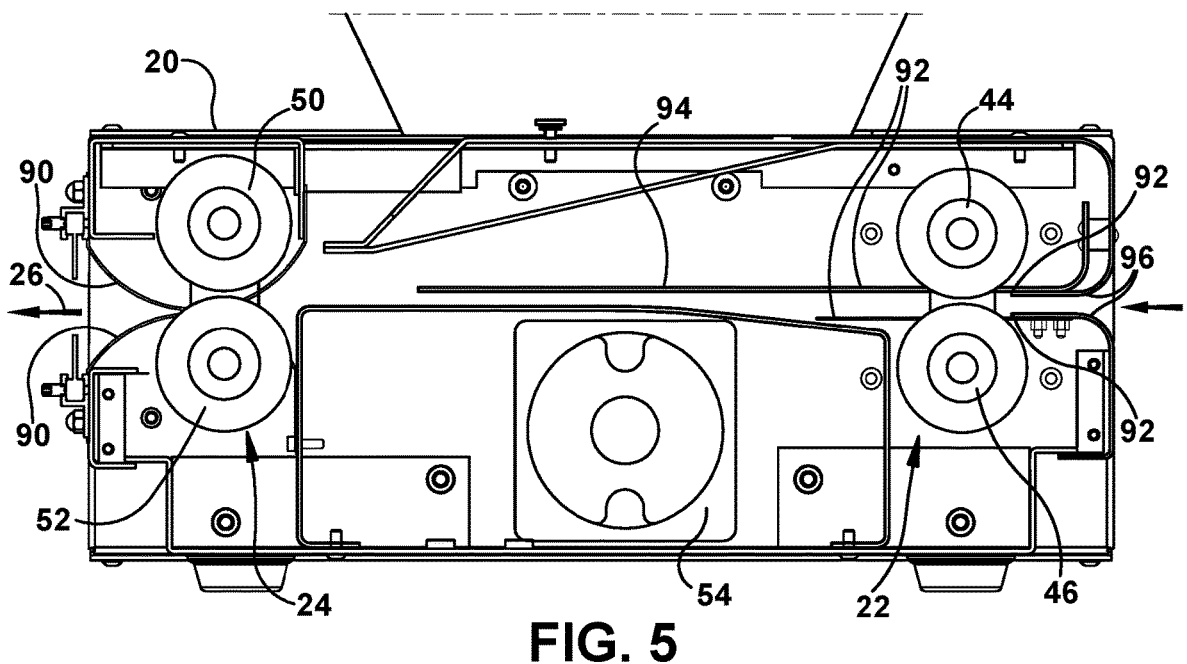
FIG. 5 is a schematic side view of the apparatus of FIG. 4.
Figure 6A:
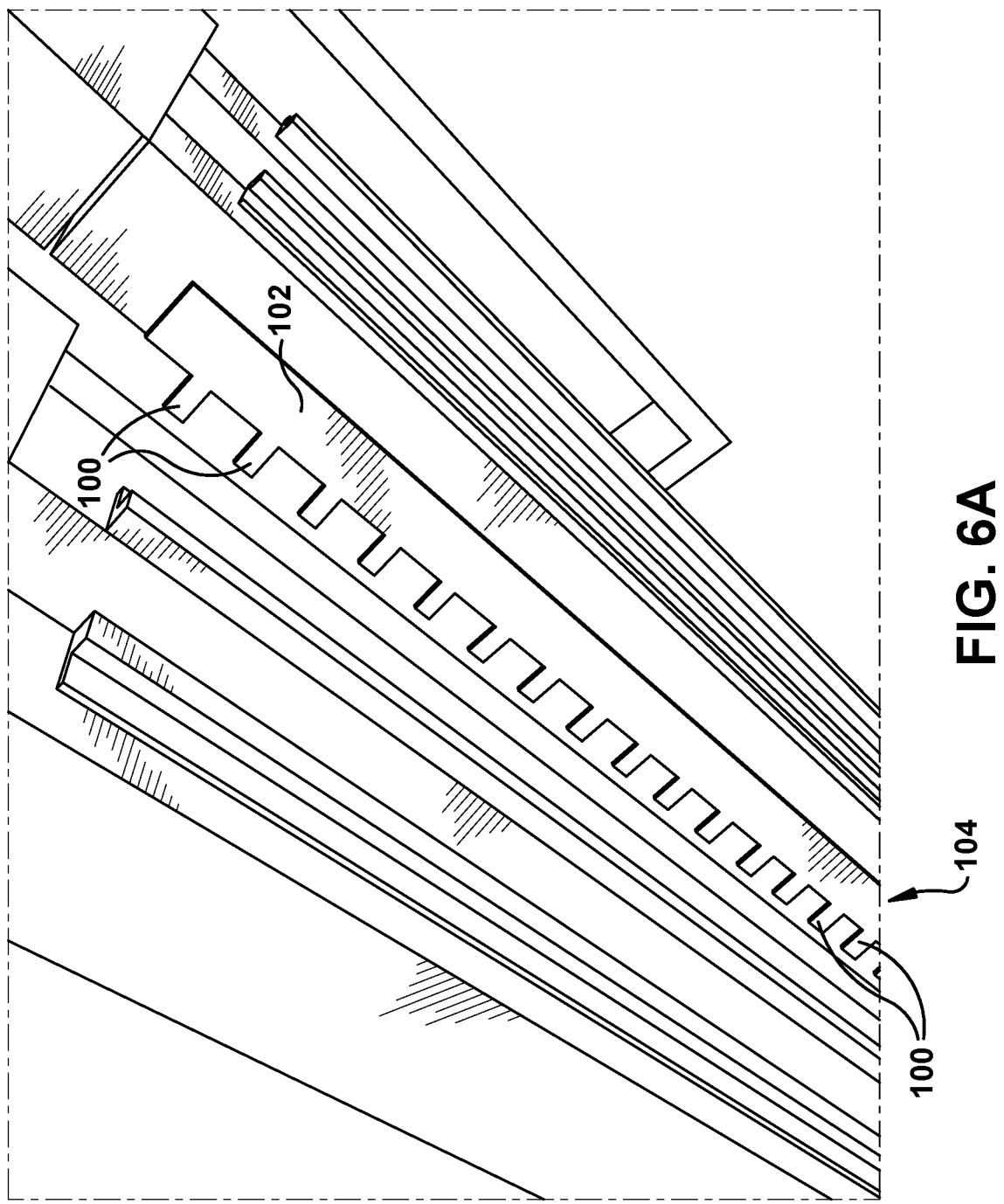
FIG. 6A is a perspective view of an exemplary guide member.
Figure 6B:
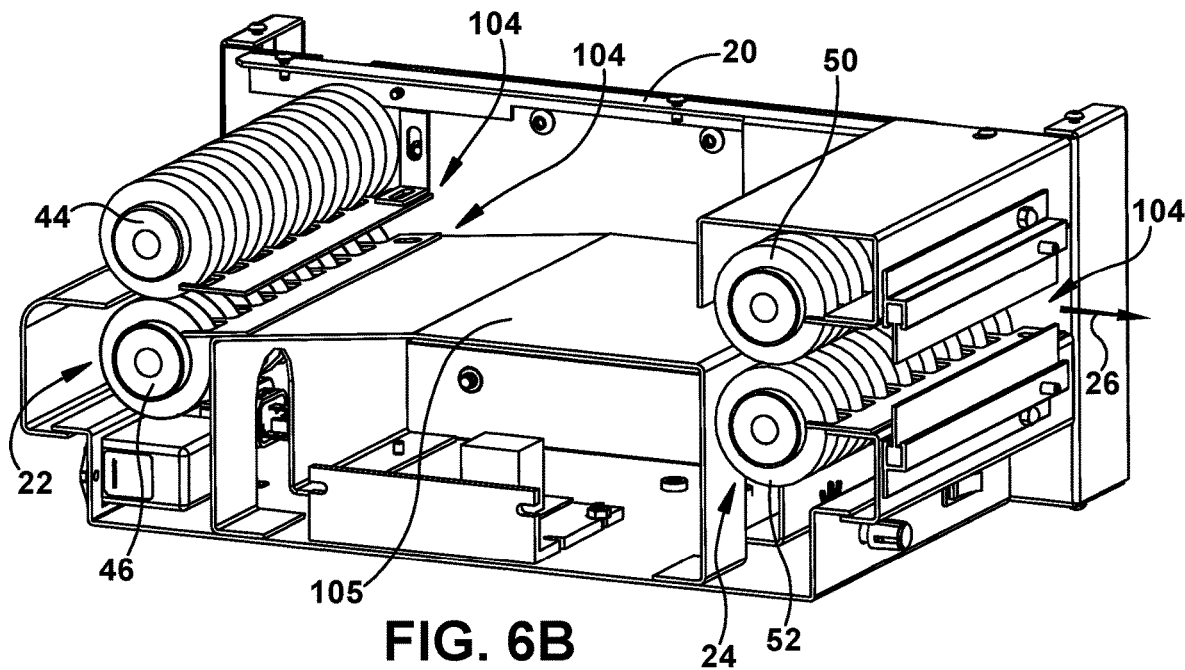
FIG. 6B is a perspective side view of another exemplary apparatus for converting a slit-sheet stock material into an expanded dunnage product including guide members with a portion of the housing removed to show the interior components.
Figure 6C:
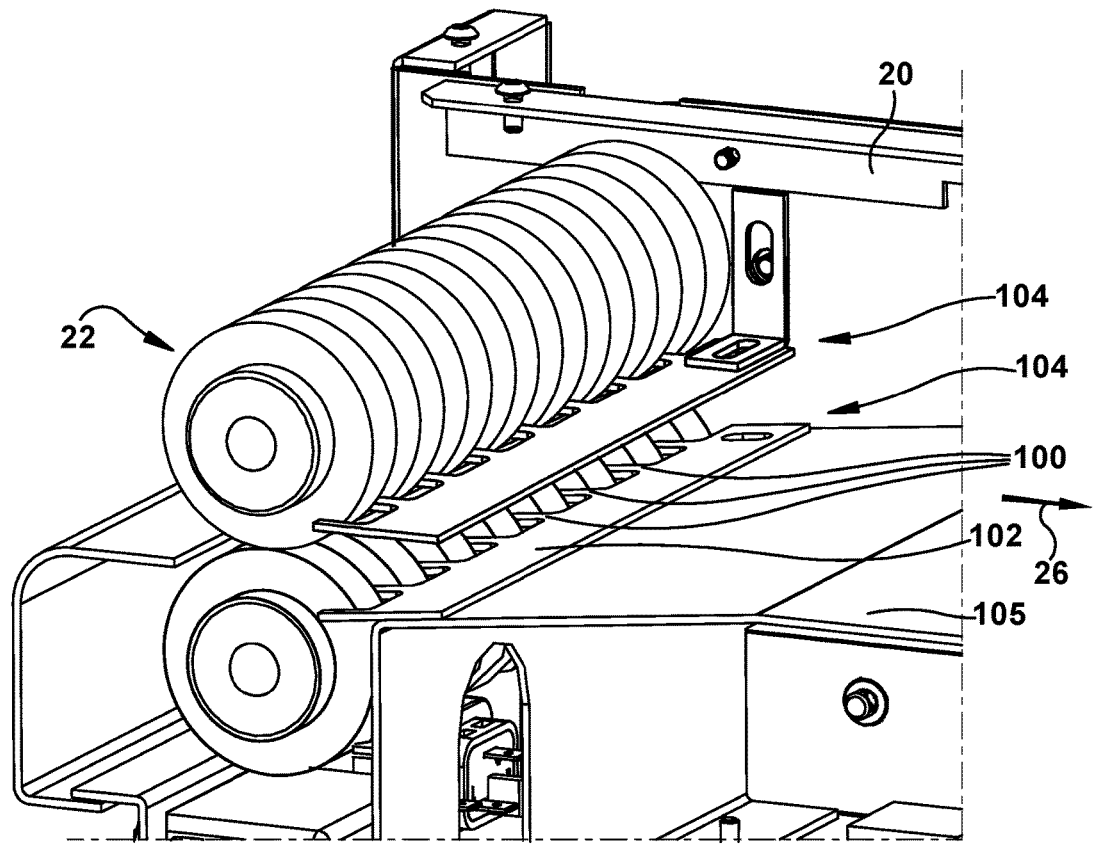
FIG. 6C is an enlarged perspective view of a portion of the upstream end of the apparatus of FIG. 6B.
Figure 6D:
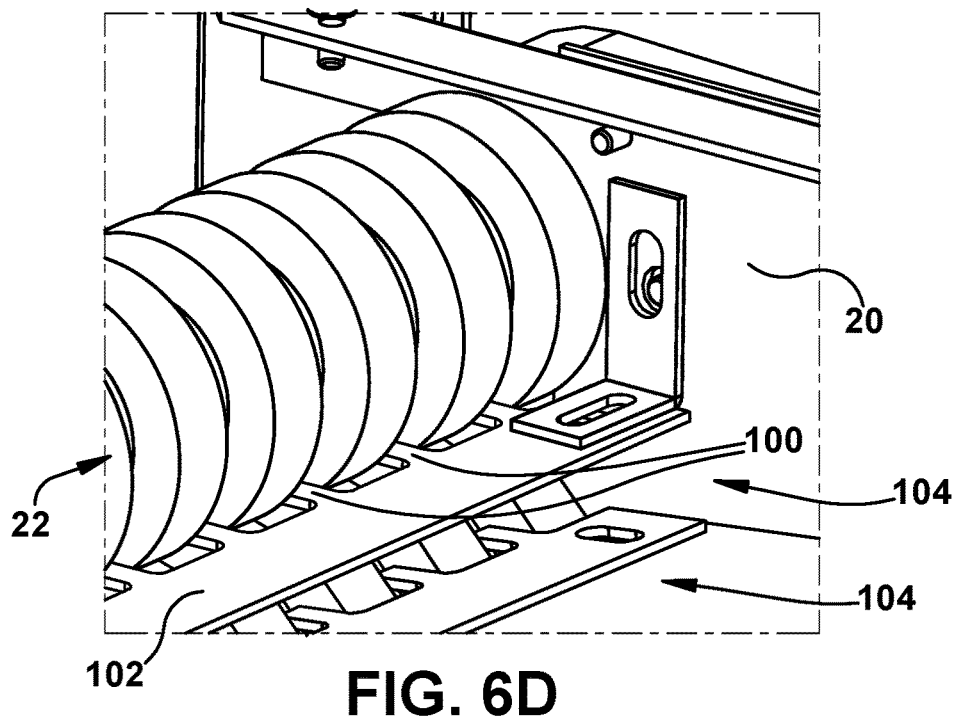
FIG. 6D is an enlarged perspective view of a portion of the upstream end of the apparatus of FIG. 6C showing attachment of the guide members.
Figure 6E:
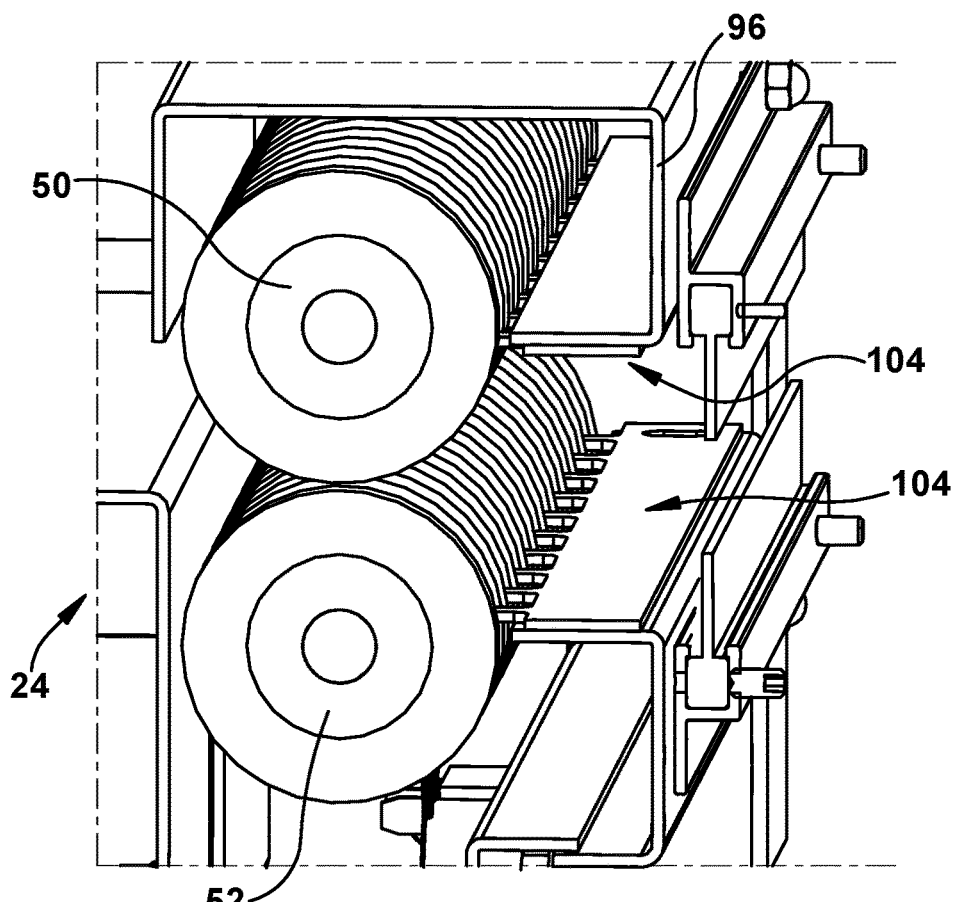
FIG. 6E is an enlarged perspective side view of a portion of the downstream end of the apparatus of FIG. 6B.
Figure 6F:
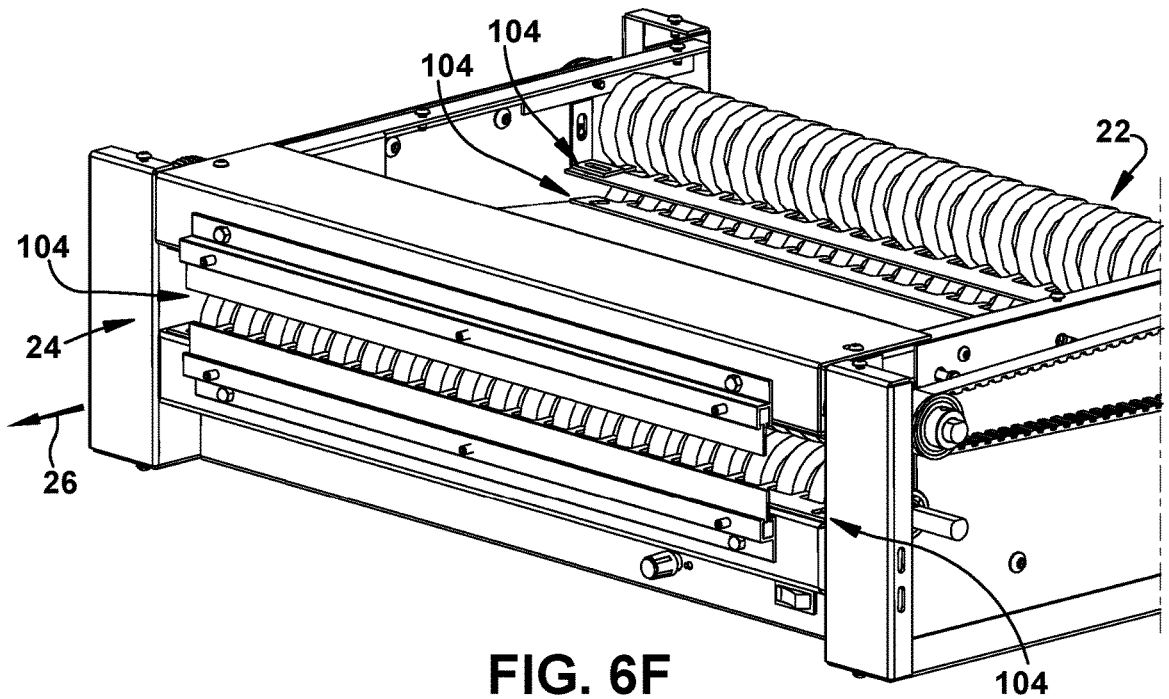
FIG. 6F is a perspective downstream end view of a portion of the apparatus of FIG. 6B.
Figure 6G:
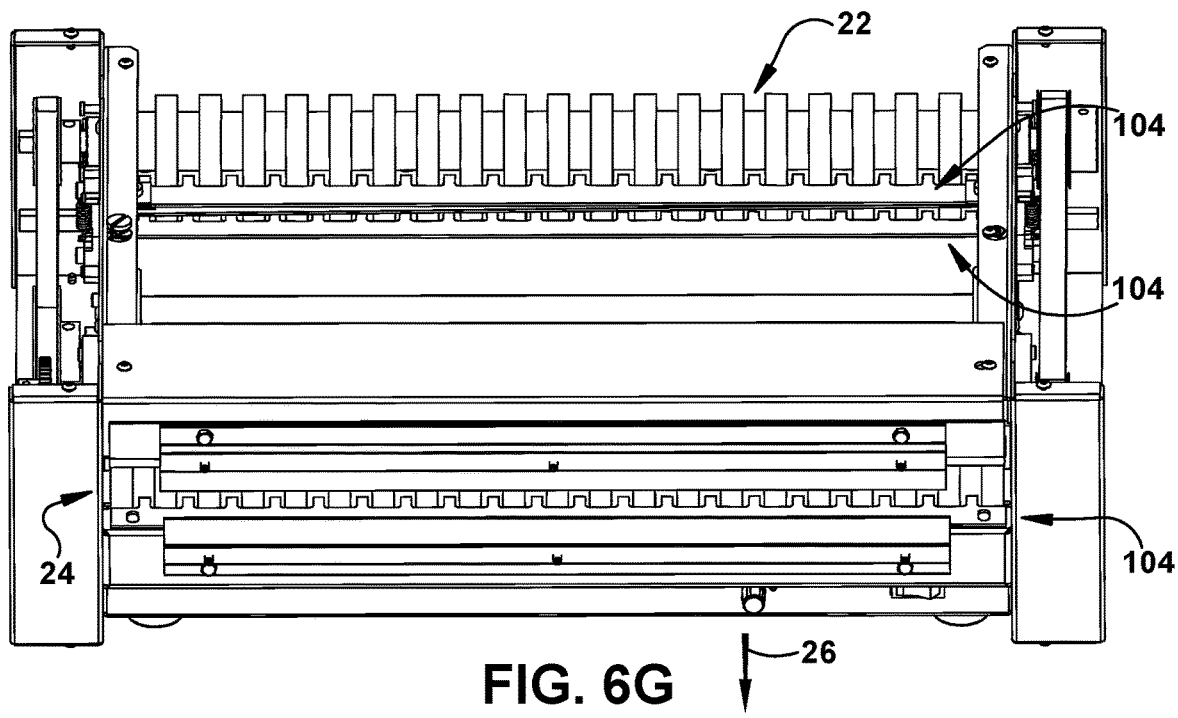
FIG. 6G is a perspective top-end view of a portion of the apparatus of FIG. 6B.

As shown in FIG. 5, a plurality of guide strips 92 may also be provided for the drive rollers 22. The guide strips 92 of the drive rollers 22 may be configured similar to or the same as the guide strips 90 of the expansion rollers 24. For example, the guide strips 92 may extend from an upstream side of the pair of drive rollers 22 to a downstream side of the pair of drive rollers 22 at a plurality of locations laterally spaced across the width of the path (along the axis of the respective drive roller 44 or 46). The drive rollers 22 may have a plurality of grooves laterally spaced across the width of the path, and the guide strips 92 may be received in respective grooves. The drive rollers 22 may have regions with a gripping material intermittently laterally spaced with regions free of gripping material along the drive rollers 22, and the guide strips 92 may extend across the respective regions free of gripping material.

The guide strips 92 may provide a smooth, continuous path for guiding the sheet material 16 downstream past the drive rollers 22. To further guide the sheet material 16 downstream to the expansion rollers 24, the guide strips 92 may extend downstream beyond the drive rollers 22. For example, the guide strips 92 may extend downstream beyond the drive roller 44 or 46, for example, by more than twice the maximum outer diameter of the drive roller 44 or 46. The guide strips 92 may optionally connect with or form a guide surface 94 that extends more than half the length of the housing 20 for enabling improved guiding of the slit sheet material 16 downstream of the drive rollers 22, particularly if the apparatus 10 is oriented in the vertical position. The guide surface 94 may be continuous with the guide strips 92, or the guide strips 92 may be operatively connected to the guide surface 94. The guide surface 94 may be a flat, continuous surface, or the guide surface 94 may be grated, have spacings or grooves, or may be formed of a different material, such as plastic, for reducing the mass of the guide surface 94 cantilevered from the guide strips 92.

The guide strips 90, 92 may be made of metal, such as aluminum or steel, or may be made of a plastic, such as nylon, or other polymer. The guide strips 90, 92 may be flexible or rigid. In particular, the guide strips 90, 92 may be rigid enough to reduce deformation or displacement of the guide strips 90, 92 when force from the slit sheet material 16 is exerted against the guide strips 90, 92. To enhance the rigidity of the guide strips 90, 92, the guide strips 90, 92 may be sufficiently thick in the direction transverse to the sheet material path. The thickness of the respective guide strips 90, 92 is preferably less than the thickness of the groove depths in the respective driver rollers 22 or expansion rollers 24, however, to enable the rollers 22, 24 to protrude beyond the guide strips 90, 92 and grip the sheet material 16. To enhance the guidance of the slit sheet material 16 past the rollers 20 or 24, the guide strips 90, 92 may have a lateral width dimension that is greater than the thickness dimension. It should be understood that the guide strips 90, 92 may be formed as wires, flat or curved strips, rounded strips having convex or concave surfaces, square bars, channeled bars, or various other configurations.

The guide strips 90, 92 may be partially or wholly integrally formed with portions of the housing 20 or may be attached to the housing 20. The housing 20 may further include shroud members 96 that define at least a portion of the entrance (or exit) paths for the sheet material 16 to (or from) one or both of the drive rollers 22 and expansion rollers 24. The guide strips 90, 92 may be attached to the housing 20 or shroud members 96 with welds, rivets, screws, an adhesive, or another fastener.

The guide strips 90, 92 provide a smooth, continuous path for the sheet material 16 and guide the sheet material 16 into the region between the upper and lower expansion rollers 50 and 52, and also prevent the sheet material from wrapping around the expansion rollers 50 or 52 on either the upstream or downstream side. As a result, a leading end of a new supply of sheet material can be confidently fed through the drive rollers 22 to the expansion rollers 24, less downtime is experienced for maintenance or clearing jams, and less sheet material is wasted from expanded sheet material being crushed from wrapping around one or both of the expansion rollers 50 and 52. This significantly improves the efficiency of the apparatus 10.

Turning to FIGS. 6A to 6G, another exemplary embodiment of a plurality of guide strips 100 for the expansion apparatus is shown. The guide strips 100 are positioned at a plurality of locations laterally spaced across the width of the path, and are connected by a laterally extending crossbar 102 to form a guide member 104. The guide strips 100 may be employed in a similar manner as the guide strips 90, 92 described above. For example, the crossbar 102 may be located at a downstream side of one of the expansion rollers 24 or the drive rollers 22, and the respective guide strips 100 may be configured to extend from a downstream side of the respective rollers 22, 24 toward an upstream side of the respective rollers 22, 24. The crossbar 102 could also be located at the upstream side of the respective rollers 22, 24 with the guide strips 100 extending downstream. The guide strips 100 and the crossbar 102 may form a partially or wholly integrally formed and unitary guide member 104. The guide member 104 may have a generally comb-shaped configuration and may be easily mountable to the housing 20, the respective shroud members 96, or other guide surfaces 105. This may make the guide member 104 suitable as a retrofit kit to reduce jamming problems of an existing apparatus 10 that does not employ guide strips.

Figure 8:
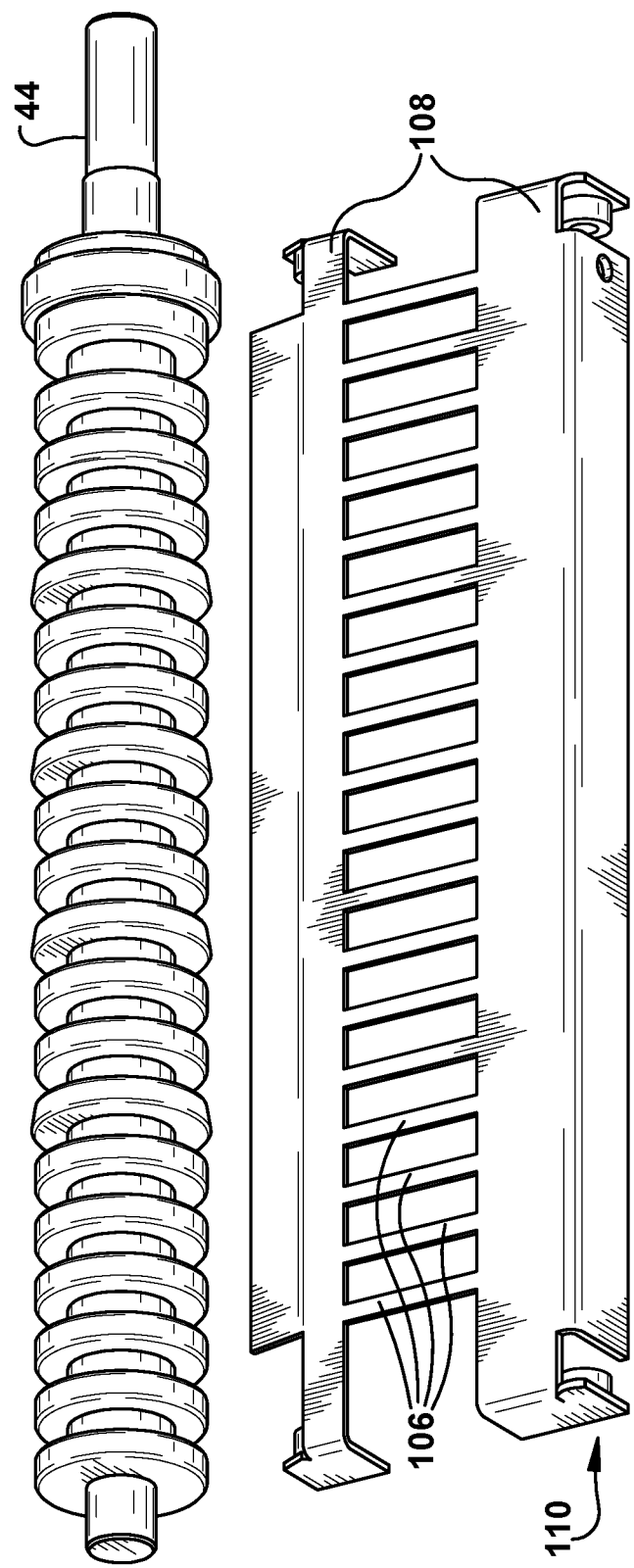
FIG. 8 is a perspective view of another guide member.
Figure 9:
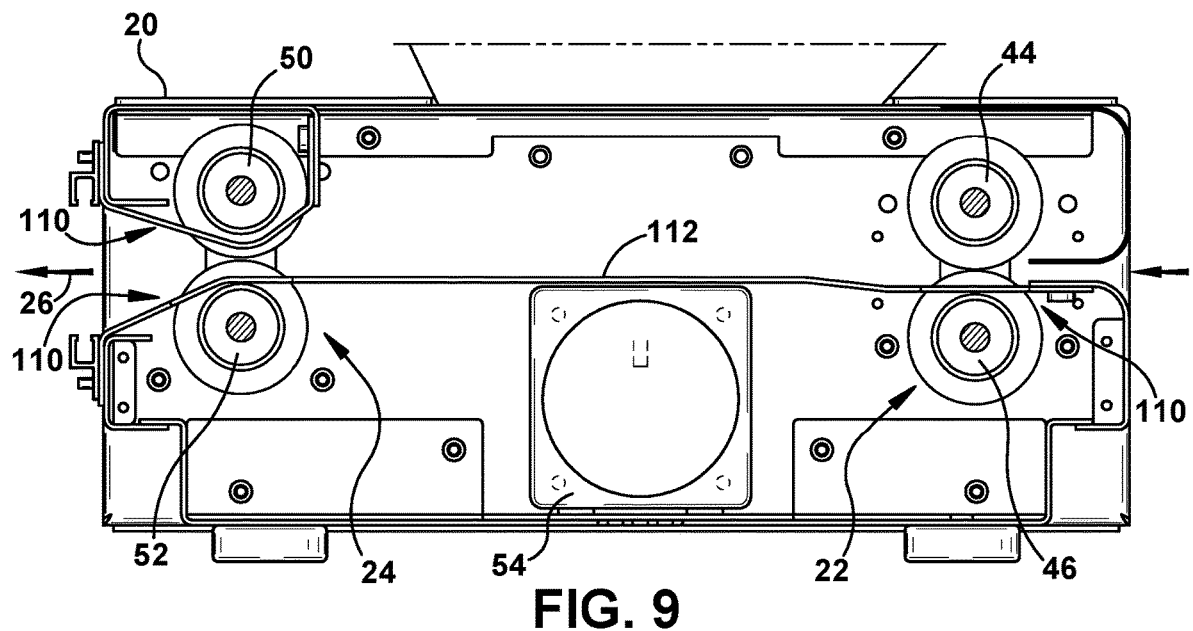
FIG. 9 is a schematic side view of another exemplary apparatus for converting a slit-sheet stock material into an expanded dunnage product including guide members with a portion of a housing removed to show the interior components.
Figure 10:
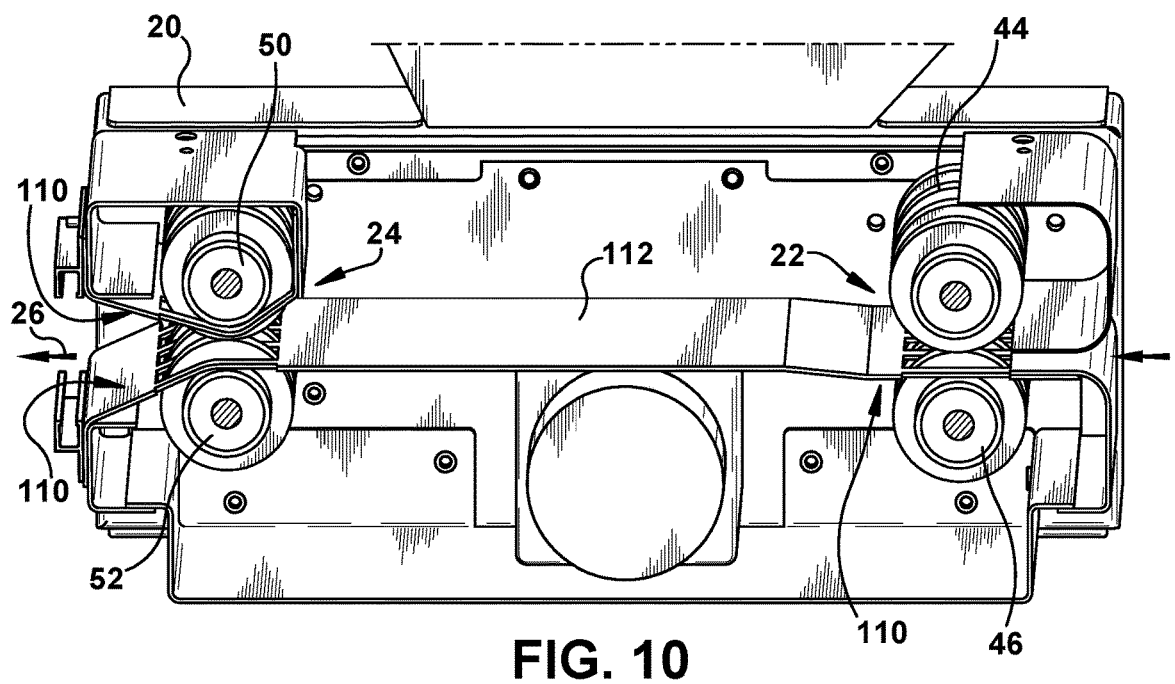
FIG. 10 is a perspective side view of the exemplary apparatus of FIG. 9.
Figure 11:
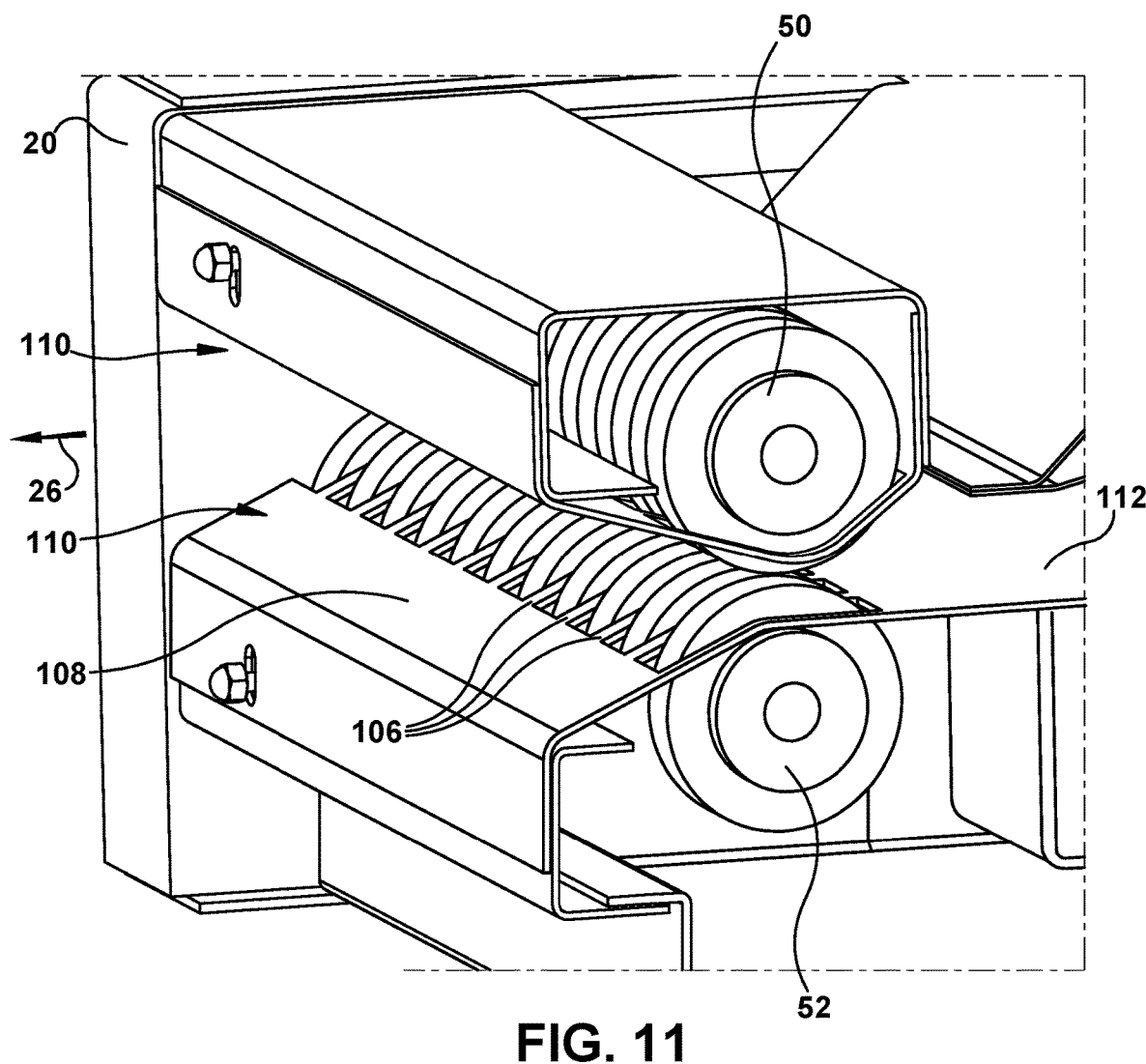
FIG. 11 is an enlarged perspective view of a portion of the downstream end of the apparatus of FIG. 9.
Figure 12:
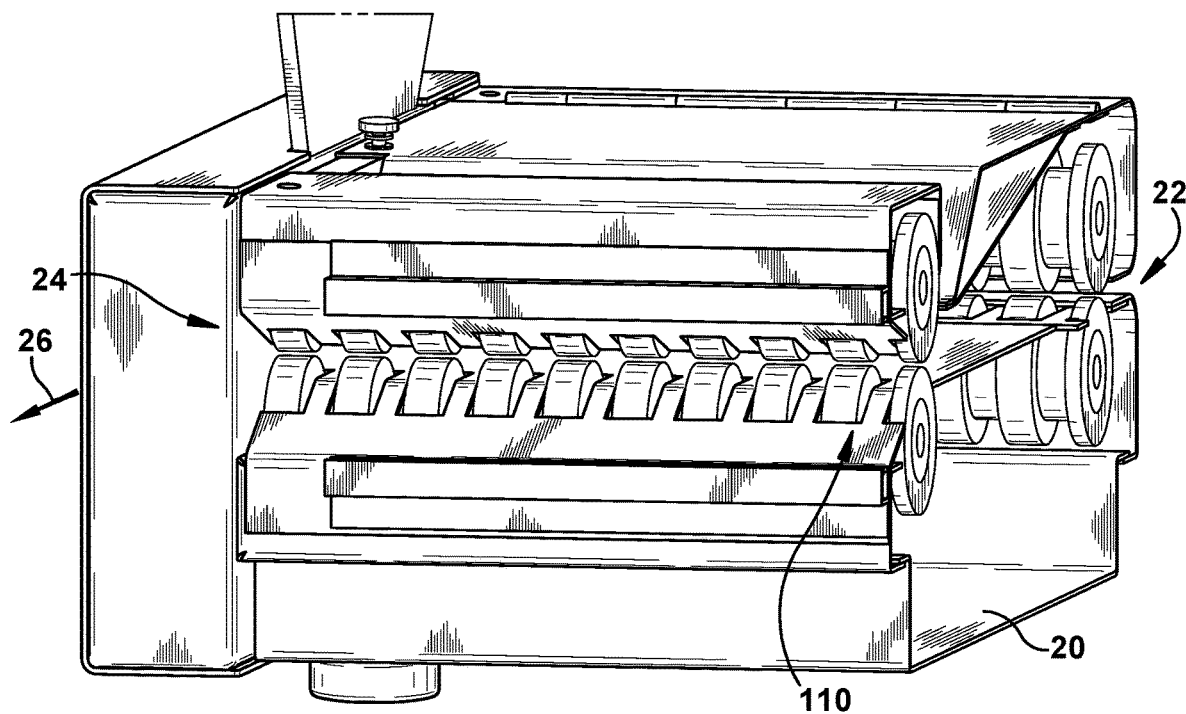
FIG. 12 is a perspective end view of the downstream end of the apparatus of FIG. 11.
Figure 13:
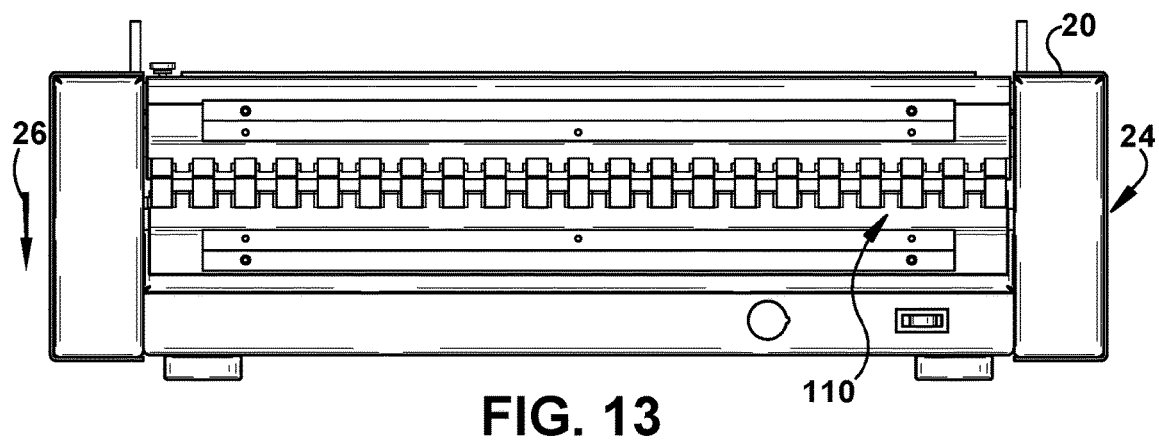
FIG. 13 is an end view of the downstream end of the apparatus of FIG. 9.
Figure 14:
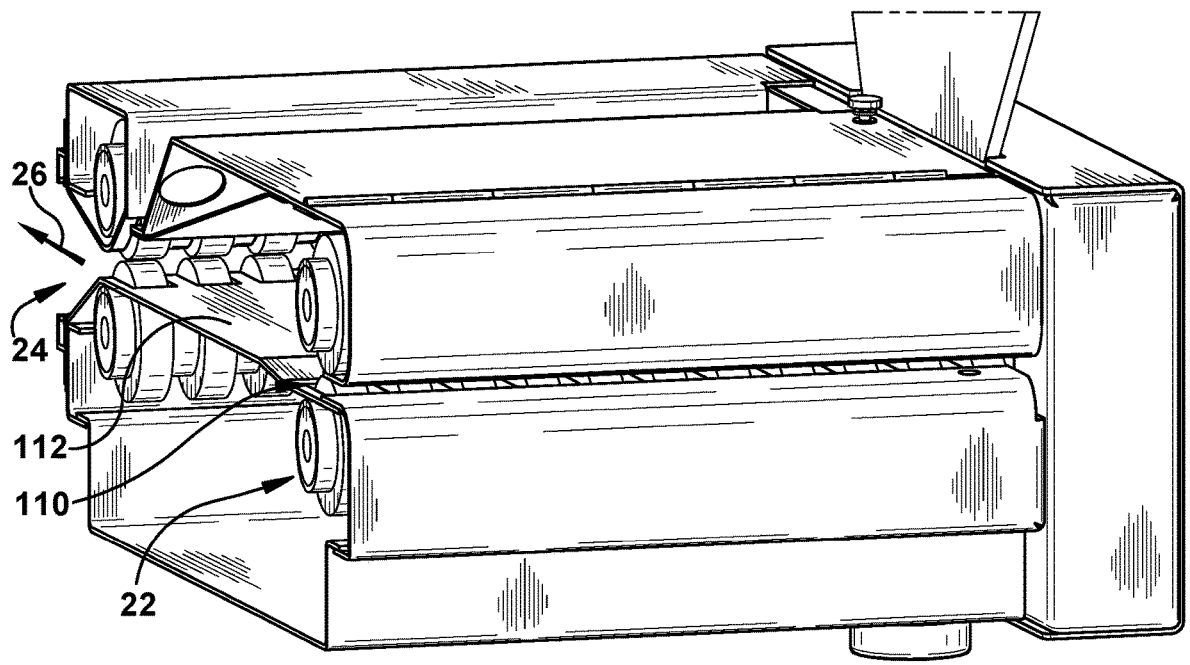
FIG. 14 is a perspective end view of a portion of an upstream end of the apparatus of FIG. 9.
Figure 15:
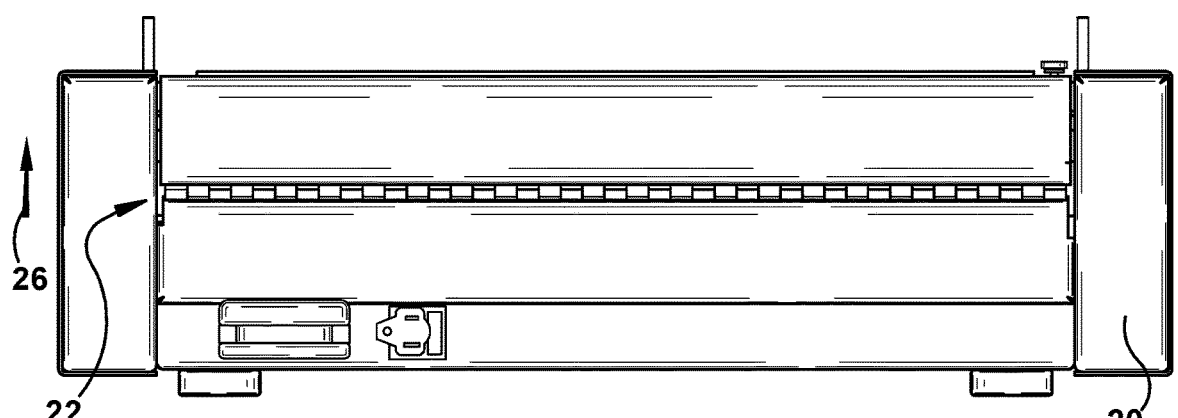
FIG. 15 is an end view of the upstream end of the apparatus of FIG. 9.

Turning to FIGS. 7 and 8, another exemplary embodiment of a plurality of guide strips 106 for the expansion apparatus is shown. As with the guide strips 100 described above, the guide strips 106 may be positioned at a plurality of locations laterally spaced across the width of the sheet material path, and the guide strips 106 may be connected at opposite ends by laterally extending crossbars 108 to form a guide member 110. The respective guide strips 106 and the respective crossbars 108 may form a partially or wholly integrally formed and unitary guide member 110. The guide member 110 may have a plate-like configuration, and the lateral spacings between the guide strips 106 may define openings in the guide member 110 for receiving respective portions of the expansion rollers 24 or drive rollers 22. In this manner, the guide member 110 may bound at least a portion of the upstream side and the downstream side of the respective rollers 22, 24. The crossbars 108 may further include portions that extend transversely to, and away from, the path of the sheet material 16 to further improve guidance and reduce jamming. The crossbars 108 or the guide member 110 may be attached to the housing 20 or the respective shroud members 96 in any suitable manner, as described above.

As shown in FIGS. 9 to 17, the guide members 108 may be configured across the respective rollers 22, 24 in various ways. For example, the guide member 108 may be angled and have a generally V-shaped configuration, as shown in the exemplary illustration of the guide member 108 for the upper expansion roller 50. The guide member 108 for the lower expansion roller 52 also may be angled. The respective guide members 108 for the lower and upper expansion rollers 50, 52 may diverge outwardly away from the path of the sheet material 16 on the downstream side of the respective rollers 50, 52 to accommodate the expansion of the sheet material 16 as it exits the roller 24.

Figure 16:
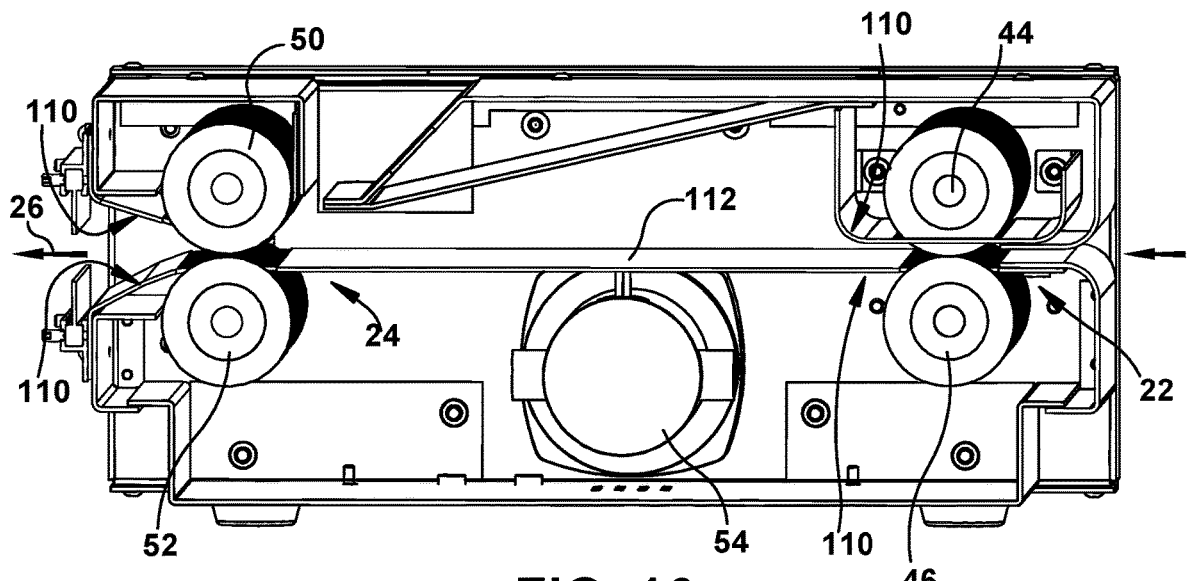
FIG. 16 is a schematic side view of the apparatus of FIG. 9 using a different guide member configuration with a portion of the housing removed to show the interior components.
Figure 17:
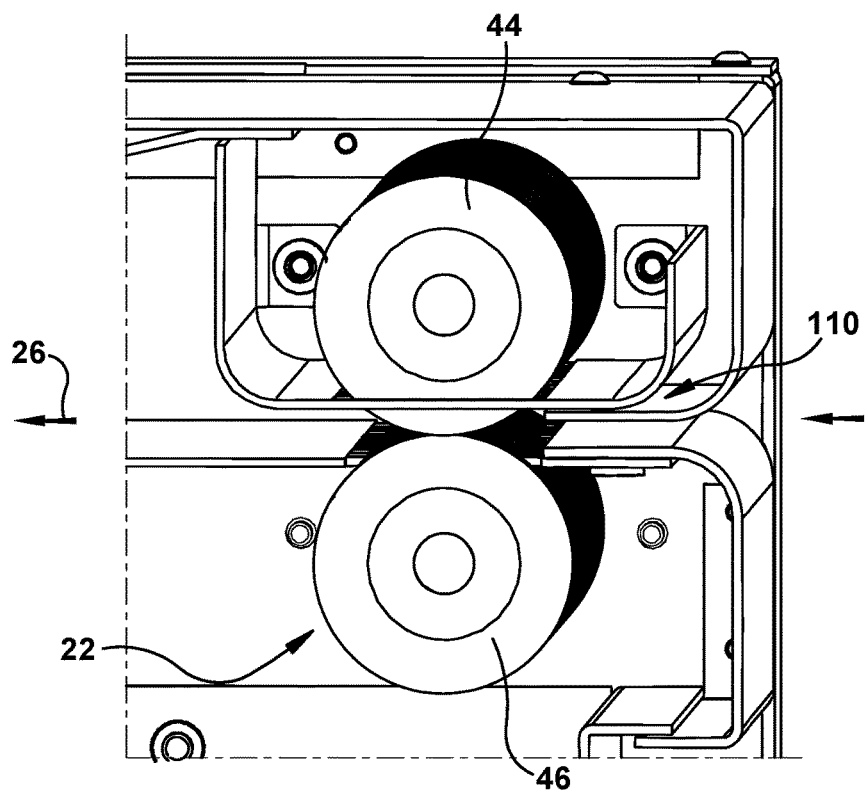
FIG. 17 is an enlarged perspective end view of a portion of the apparatus of FIG. 16.

The guide member 108 also may be configured as U-shaped, or C-shaped, as shown in the exemplary illustration of the guide member 108 for the upper drive roller 44 in FIGS. 16 and 17. The guide member 108 also may be configured as a relatively flat plate across the roller, as shown in the exemplary illustration of the guide member 108 for the lower drive roller 46. The respective guide members 108 for the lower and upper drive rollers 44, 46 may be parallel and define a relatively narrow space to guide the leading edge of the unexpanded sheet material 16 between the drive rollers 22.

The guide member 108 also may define a guide surface 112 that extends from an upstream side of one of the pair of drive rollers 22, such as lower drive roller 46, to a downstream side of one of the pair of expansion rollers 24, such as lower expansion roller 52. The guide surface 112 may be a flat, continuous surface, or the guide surface 94 may be grated, grooved, recessed, or may have various other configurations suitable for guiding the sheet material 16. The guide surface 112 may be operatively connected at one or both ends to the respective guide members 108, or the guide members 108 may form an integral and unitary structure with the guide surface 112.

The embodiments of any of the guide strips 90, 92, 100, 106 and guide members 104, 110 exemplarily illustrated in FIGS. 1 to 17 may be substituted for one another or used in conjunction with one another where applicable.

The expansion apparatus 10 can be used to produce a composite expanded packaging product by either feeding the unslit separator sheet 34 with the expanded sheet 12 through the expansion rollers 24, as shown in FIG. 1, or by separately feeding the unslit separator sheet and combining it with the expanded sheet downstream of the expansion rollers 24. Braking the rollers 22 and 24 facilitates tearing the desired length of expanded sheet material 12 from the remaining unexpanded sheet material. Alternatively, a cutting blade may be provided downstream of the expansion rollers to sever the delivered quantity of expanded sheet material from the remainder.

Figure 18:
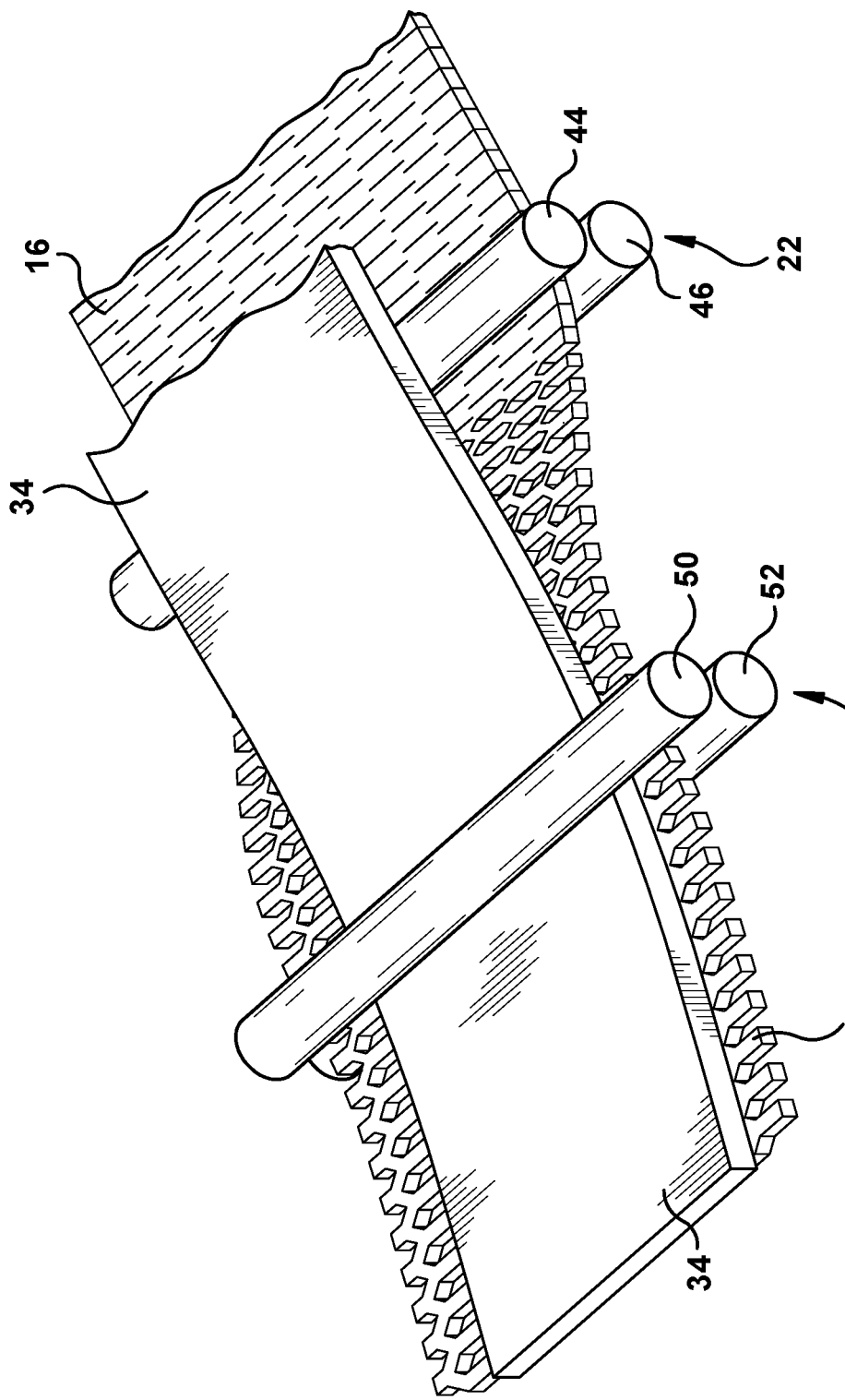
FIG. 18 is a perspective schematic illustration of the expansion of a slit-sheet stock material and separator sheet combination in a dunnage product.

FIG. 18 illustrates an exemplary layer of expandable material 16 having an array of slits/apertures in an unexpanded form, which slits allow cells to open up as the sheet material is stretched in a direction transverse the direction of the slits, to form the expanded packaging material 12. FIG. 18 also illustrates how the slit sheet material 16 is expanded between the drive rollers 22 and the expansion rollers 24. In the expansion process of FIG. 18, only the unexpanded slit sheet material 16 is fed off the roll 14 (FIG. 1) through the drive rollers 22. The separator sheet 34 is brought in from another roll (FIG. 1) and fed only through the expansion rollers 24. This method eliminates separator sheet 34 from being exposed to the pulling force that expands the slit sheet material 16. Thus the need for any type of slit pattern in the separator sheet 34 is eliminated.

An exemplary slit sheet material 16 that can be stretched to an expanded form is die-cut kraft paper with the slits extending widthwise at intermittent locations across the width of the sheet material. An exemplary separator sheet material 34 is a lightweight paper, such as tissue paper. Different types of paper and non-woven fibrous sheet materials may be used to form the expanded sheet material 12 and the separator sheet material 34.

Because overlapping layers of the expanded sheet material 12 tend to nest, the thickness of nested multiple layers is less than the sum of measuring the thickness of the same number of unnested layers. The cushioning characteristics of the expanded sheet 12 can be further improved and is dramatic with respect to certain applications, by separating layers of the expanded sheet material 12 from each other and thus precluding the nesting of adjacent cells.

The separator sheet is distinguished from the expanded sheet by virtue of not having a cooperating or matching slit pattern. The separator sheet is defined as a sheet which does not nest with the lands and/or legs of the expanded sheet, but rather, distributes impact from the expanded sheets to from the legs and/or lands of the expanded sheet to at least cell-sized regions of the next layer of expanded sheet. The separator sheet causes each leg and land to operate independently, rather than in nested groups. Mixed combinations of nested and separated expanded sheets layers can be used to provide properties which are customized to a particular application.

The apparatus 10 thus described can be used to produce an expanded packaging product for use directly as a wrapping material. The apparatus 10 is compact, minimizing space requirements, while yielding maximum packaging from the supplies 30 and 32 of unexpanded slit sheet material 16 and separator sheet material 34.

The expanded slit-sheet cushioning wrap material can be an alternative to plastic air-bubble packaging or other packaging used to protect items during shipping. The illustrated cushioning wrap material includes an elongate layer of expanded sheet material 12 having an array of openings, and an elongate layer of interleaf or separator sheet material 34 adjacent the layer of expanded sheet material 12 in face-to-face relationship. Both the expanded sheet material 12 and separator sheet material 34 can be biodegradable, recyclable and compostable. The separator sheet 34 typically is substantially free of expansion slits to prevent the expanded sheet material 12 from interlocking with the separator sheet 34.

The slit sheet material 16, once expanded, creates semi-rigid peaks or lands as shown in FIGS. 19 and 20. These peaks are similar to a spring in that once force is applied and removed, they return to their original position, providing the elastic limit is not exceeded. By winding the paper in the form of a cylinder, or otherwise overlapping layers of expanded slit sheet material 12, the tension on the expanded sheet material 12 can be maintained without the use of adhesives or the like, since the cells of overlapping layers "interlock," thus maintaining the relative position of adjacent layers.

FIG. 19 illustrates, from a side view, how the separator sheets prevent the expanded sheets from nesting. The peaks of the expanded paper rest on the separator sheet thereby causing impact to be transmitted through the separator sheets as described in detail further herein. Decreased nesting can also be obtained by reversing the incline of the lands of the cells as shown in FIG. 20. Nesting can also be substantially negated by wrapping the expanded paper in the flag fold described in FIGS. 21 and 22.

A flag fold is illustrated in FIGS. 21 and 22 using the above disclosed multi-layer combinations. A long strip of the multi-layer combination is folded in a manner similar to the customary fold for flags. A corner is folded back on itself, diagonally, to produce a triangular region which is then folded back. The sheet is repeated folded back on itself, diagonally, to form triangular regions and the process is repeated until the desired thickness of material is produced. The cell pattern is rotated forty-five degrees between layers, thus producing reduced nesting in multi-layer combination where the expanded paper comes in contact with itself. Even with the ninety degree rotations of the cell pattern, however, nesting does occur. If a stiffer flag fold is desired, multi-layer combination product using separator paper on at least one side is used. This can be obtained through use of the multi-layer combination produced with the expander.

The multi-ply structure has particular utility as a low cost void fill material. The use of a multi-layer combination allows the paper weight on both the expanded 12 and unexpanded separator sheets 34 to be lowered. A multi-layer combination using unslit tissue paper and expanded slit kraft paper produces a void fill packaging material having a cost roughly comparable to that of styrene and/or styrofoam peanuts, while providing better performance. Additionally, the ecological advantages of post-consumer, recyclable wrapping material, over ecologically-unfriendly styrene foam peanuts should be obvious.

In summary, an apparatus 10 for converting a slit-sheet stock material 16 into an expanded dunnage product includes a housing 20, a pair of rollers 22, 24 within the housing 20 extending widthwise across a path of the sheet material 16, and a plurality of guide strips 90, 92, 100, 106 extending from an upstream side of the pair of rollers 22, 24 to a downstream side of the pair of rollers 22, 24 at a plurality of locations spaced across the width of the path. The guide strips 90, 92, 100, 106 guide the sheet material 16 between and around the rollers 22, 24, but prevent the sheet material 16 from wrapping around or bypassing the rollers 22, 24 and causing a jam, even if back-pressure is applied to the sheet material 16 downstream of the rollers 22, 24. Exemplary rollers 22, 24 have a plurality of grooves spaced across the width of the path, and the guide strips 90, 92, 100, 106 are received in respective grooves. The respective guide strips 100, 106 may be connected by one or more crossbars 102, 108 to form a guide member 104, 110, which may enable an improvement in the rigidity, assembly and guidability of the guide strips 100, 106, and may further reduce the occurrence of jamming.

Although the invention has been shown and described with respect to certain preferred embodiments, it is obvious that equivalent alterations and modifications will occur to others skilled in the art upon the reading and understanding of this specification and the annexed drawings. In particular regard to the various functions performed by the above described components, the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention can have been disclosed with respect to only one of the several embodiments, such feature can be combined with one or more other features of the other embodiments as may be desired and advantageous for any given or particular application.

What is claimed is:

1. An apparatus for converting a slit-sheet stock material into an expanded dunnage product, the apparatus comprising:
   a housing,
   a pair of expansion rollers within the housing extending widthwise across a path of the sheet material, and
   a plurality of guide strips extending from an upstream side of the pair of expansion rollers to a downstream side of the pair of expansion rollers at a plurality of locations laterally spaced across the width of the path.

2. The apparatus as set forth in claim 1, where one of the pair of expansion rollers has a plurality of grooves laterally spaced across the width of the path, and the guide strips are received in respective grooves.

3. The apparatus as set forth in claim 2, where the other one of the pair of expansion rollers has a plurality of grooves laterally spaced across the width of the path, and the guide strips are received in respective grooves.

4. The apparatus as set forth in claim 1, where the guide strips are mounted across one of the pair of expansion rollers, and the guide strips are mounted across the other one of the pair of expansion rollers.

5. The apparatus as set forth in claim 4, where at least one guide strip around one of the pair of expansion rollers is aligned with one of the guide strips around the other one of the pair of expansion rollers.

6. The apparatus as set forth in claim 1, where at least one of the pair of expansion rollers has regions with a gripping material intermittently spaced with regions free of gripping material, and the guide strips extend across the respective regions free of gripping material.

7. The apparatus as set forth in claim 1, where the guide strips are attached to the housing.

8. The apparatus as set forth in claim 1, where the respective guide strips are connected at one end by a crossbar configured to extend laterally across the width of the path.

9. The apparatus as set forth in claim 8, where the respective guide strips and the crossbar form a unitary guide member.

10. The apparatus as set forth in claim 8, where the crossbar is located at an upstream side of at least one of the pair of expansion rollers, and
where the respective guide strips extend toward a downstream side of the at least one of the pair of expansion rollers.

11. The apparatus as set forth in claim 8, where the crossbar is mountable to the housing.

12. The apparatus as set forth in claim 8, where the respective guide strips are connected at an opposite end by a second crossbar configured to extend laterally across the width of the path.

13. The apparatus as set forth in claim 12, where the respective guide strips and the respective crossbars form a unitary guide member;
where the lateral spacings between the guide strips define openings in the guide member for receiving respective portions of the expansion rollers.

14. The apparatus as set forth in claim 13, where the guide member bounds at least a portion of the upstream side and the downstream side of at least one of an upper one of the pair of expansion rollers;
where at least a portion of the upstream side of the guide member extends along a plane transverse to the sheet material; and
where at least a portion of the downstream side of the guide member extends along a plane transverse to the sheet material.

15. The apparatus as set forth in claim 13, further comprising a pair of drive rollers upstream of the pair of expansion rollers, where the guide member defines a guide surface that extends from an upstream side of one of the pair of drive rollers to a downstream side of one of the pair of expansion rollers.

16. The apparatus as set forth in claim 1, where the guide strips are made of steel and have a width dimension that is greater than a thickness dimension, and the width direction is parallel to the width of the path of the sheet material.

* * * * *